(12) United States Patent
Denk

(10) Patent No.: US 7,219,881 B2
(45) Date of Patent: May 22, 2007

(54) SHOCK ABSORBER

(75) Inventor: Peter Denk, Freiburg (DE)

(73) Assignee: Denk Engineering GmbH, Freiburg (DE)

( * ) Notice: Subject to any disclaimer, the term of this patent is extended or adjusted under 35 U.S.C. 154(b) by 0 days.

(21) Appl. No.: 10/857,585

(22) Filed: May 28, 2004

(65) Prior Publication Data

US 2005/0012255 A1 Jan. 20, 2005

(51) Int. Cl.
*F16F 9/14* (2006.01)
(52) U.S. Cl. .................................. 267/64.15
(58) Field of Classification Search ............ 267/64.15, 267/64.16, 217, 64.23; 280/124.162
See application file for complete search history.

(56) References Cited

U.S. PATENT DOCUMENTS

| 3,726,517 | A | * | 4/1973 | Lutz | .................. | 267/64.23 |
| 5,547,211 | A | * | 8/1996 | Runkel | ................ | 267/64.15 |
| 6,024,366 | A | * | 2/2000 | Masamura | ............. | 267/217 |
| 6,250,658 | B1 | * | 6/2001 | Sakai | ................. | 280/124.162 |

FOREIGN PATENT DOCUMENTS

| DE | 29724898 U1 | 10/1997 |
| DE | 19743543 | 4/1999 |
| DE | 20210280 U1 | 8/2002 |
| DE | 10251212 B4 | 10/2002 |

* cited by examiner

*Primary Examiner*—Melanie Torres
(74) *Attorney, Agent, or Firm*—Jenner & Block LLP

(57) ABSTRACT

A shock absorber (1), in particular for bicycles, has a first cylinder (2*a*) with a fluid chamber (3*a*) filled with a transmission or damping medium. An outwardly leading piston rod (6) with piston (5*a*) for receiving the shocks to be dampened is borne axially displaceable in the first cylinder (2*a*). A second cylinder (2*b*) that has a fluid chamber (3*b*) filled with the transmission or damping medium and an air- or gas-filled gas pressure chamber (4*b*). The fluid chambers (3*a*, 3*b*) of the first and second cylinders (2*a*, 2*b*) communicate with one another via a communicating channel (7). At least a third cylinder (3*c*) [sic] with an air- or gas-filled gas pressure chamber (4*c*) and a fluid chamber (3*c*) filled with the transmission or damping medium is provided. The fluid chamber(s) (3*c*, 3*d*) of the third and of the additional cylinders (2*c*, 2*d*), if any, is/are mechanically linked to the fluid chambers (3*a*, 3*b*) of the first and second cylinders (2*a*, 2*b*) via a communicating channel (7), and in the region of the communicating channel (7) at least one switch apparatus (11) is provided for blocking or releasing communication between the fluid chamber (3*a*) of the first cylinder (2*a*) and one or a plurality of fluid chambers (3*b*, 3*c*, 3*d*) of the additional cylinders (2*b*, 2*c*, 2*d*)

42 Claims, 19 Drawing Sheets

SHOCK ABSORBER

The invention relates to a shock absorber, in particular for bicycles, with a first cylinder that has a fluid chamber filled with a transmission or damping medium and in which an outwardly leading piston rod with piston for receiving the shocks to be dampened or compressed is borne axially displaceable, and with a second cylinder that has a fluid chamber filled with the transmission or damping medium and an air- or gas-filled gas pressure chamber, whereby the fluid chambers of the first and second cylinders communicate with one another via a communicating channel.

Such shock absorbers are already known and are used for instance on bicycles in order to equalize uneven terrain and to make riding more pleasant and safer. However, in the previously known shock absorbers of the type cited in the foregoing it is disadvantageous that the pre-set spring rate cannot be changed while the bicycle is being ridden, although softer or harder spring rates would be advantageous for various uses. For instance, a shock absorber can be optimized for riding on uneven terrain so that it compresses softly. However, such suspension behavior has a negative effect when riding on even surfaces, in particular when pedaling out of the saddle, since in this case hard compression is advantageous. On a completely flat surface, it can even be advantageous to block compression entirely.

The object is therefore to create a shock absorber of the type cited in the foregoing in which the compression behavior is adjustable and can thus be adapted to different external conditions.

The inventive solution to this object is comprised in particular in that at least a third cylinder with an air- or gas-filled gas pressure chamber and a fluid chamber filled with the transmission or damping medium is provided, in that the fluid chamber(s) of the third and of the additional cylinders, if any, is/are mechanically linked to the fluid chambers of the first and second cylinders via at least one communicating channel, and in that in the region of the communicating channel at least one switch apparatus is provided for blocking or releasing the communication between the fluid chamber of the first cylinder and one or a plurality of fluid chambers of the additional cylinders.

With the switch apparatus, the gas pressure chambers of the second and third cylinders and of any additional cylinders can be selectively activated or switched to inactive in that each of the communicating channels leading to them is opened or closed and thus transmission or damping medium, for instance oil, displaced out of the fluid chamber of the first cylinder can travel or not travel into the fluid chambers of the other cylinders. When the communicating channel is open, the transmission or damping medium displaces into the fluid chamber, which compresses the gas in the gas pressure chamber.

The gas pressure chambers of the second, third, and any additional cylinders act as positive gas pressure chambers, that is, as transmission or damping medium increasingly penetrates, the force required to further compress the gas in the gas pressure chamber increases.

The entire force acting on the piston rod that is caused for instance by a shock to the wheel when the wheel travels over a rock is distributed to the individual cylinders that are in flow-communication with the fluid chamber of the first cylinder. The more cylinders and thus positive gas pressure chambers integrated into the system, the smaller the increase in pressure in the positive gas pressure chambers, which means the piston rod can compress more easily. Thus, by switching on or blocking an individual cylinder or a plurality of cylinders, the compression behavior of the entire shock absorber can be varied within broad limits. For instance, when riding on even terrain, the communicating channel can be completely closed so that no transmission or damping medium can escape from the fluid chamber of the first cylinder and the shock absorber is blocked. When riding on terrain, the communicating channel can be opened to one or a plurality of cylinder(s) so that even minor forces cushion the wheel.

Another embodiment provides that an air- or gas-filled gas pressure chamber is provided that communicates with the gas pressure chamber of the first cylinder via a communicating channel, and in that provided in the region of this communicating channel is a switch apparatus for opening or closing the communicating channel. The same air or gas pressure is set both in the gas pressure chamber of the first cylinder and in the additional gas pressure chamber. By opening or closing the communicating channel, the entire volume of the gas pressure chamber acting in the first cylinder as negative chamber can be changed, which can also vary the compression behavior of the shock absorber.

One design of the inventive shock absorber for which independent protection is being claimed provides that an injection needle that is drive-linked to the piston rod and that faces the communicating channel is provided, and it can be inserted into the aperture area of the communicating channel that is embodied as injection needle receiving element by moving the piston rod into the cylinder, and in that a switch apparatus is provided for blocking or releasing the communication between the fluid chambers, at least in the area of the communicating channel embodied as injection needle receiving element or of another communicating channel that links the fluid chambers.

What the injection needle accomplishes is that as the insertion depth of the piston rod increases, the free cross-section through which transmission or damping medium can escape out of the fluid chamber of the first cylinder into the communicating channel changes. The force that is required to move the piston rod in further can be controlled depending on the insertion depth.

In addition, by blocking or opening the communicating channel between the fluid chambers, the compression and/or damping behavior of the shock absorber can be varied as in the embodiment described in the foregoing.

It should be mentioned that the term "shock absorber" should not be construed as just a shock absorber in the narrow technical sense. What is meant is not just for instance shock absorbers as they are employed for rear-wheel suspension of a bicycle, but for instance and in particular also shock absorbers integrated into spring forks or telescoping spring forks for suspension of the front wheel on a bicycle. Likewise, the definition of terms is not limited to pure damping elements, but also includes elements with combined damping and suspension behavior.

Likewise, the term "cylinder" herein is not limited to cylinders in the narrow technical sense. On the contrary, it includes a recess of any type that is inserted into a carrier body and that can have various sectional profiles, for instance circular, elliptical, or polygonal. The cylinders can be inserted into a body through bores, for instance. Likewise, the individual cylinders can be arranged and disposed in a common body.

Additional embodiments of the inventive shock absorber result from the description and from the following described drawings.

FIG. 7 and

Figure 8:
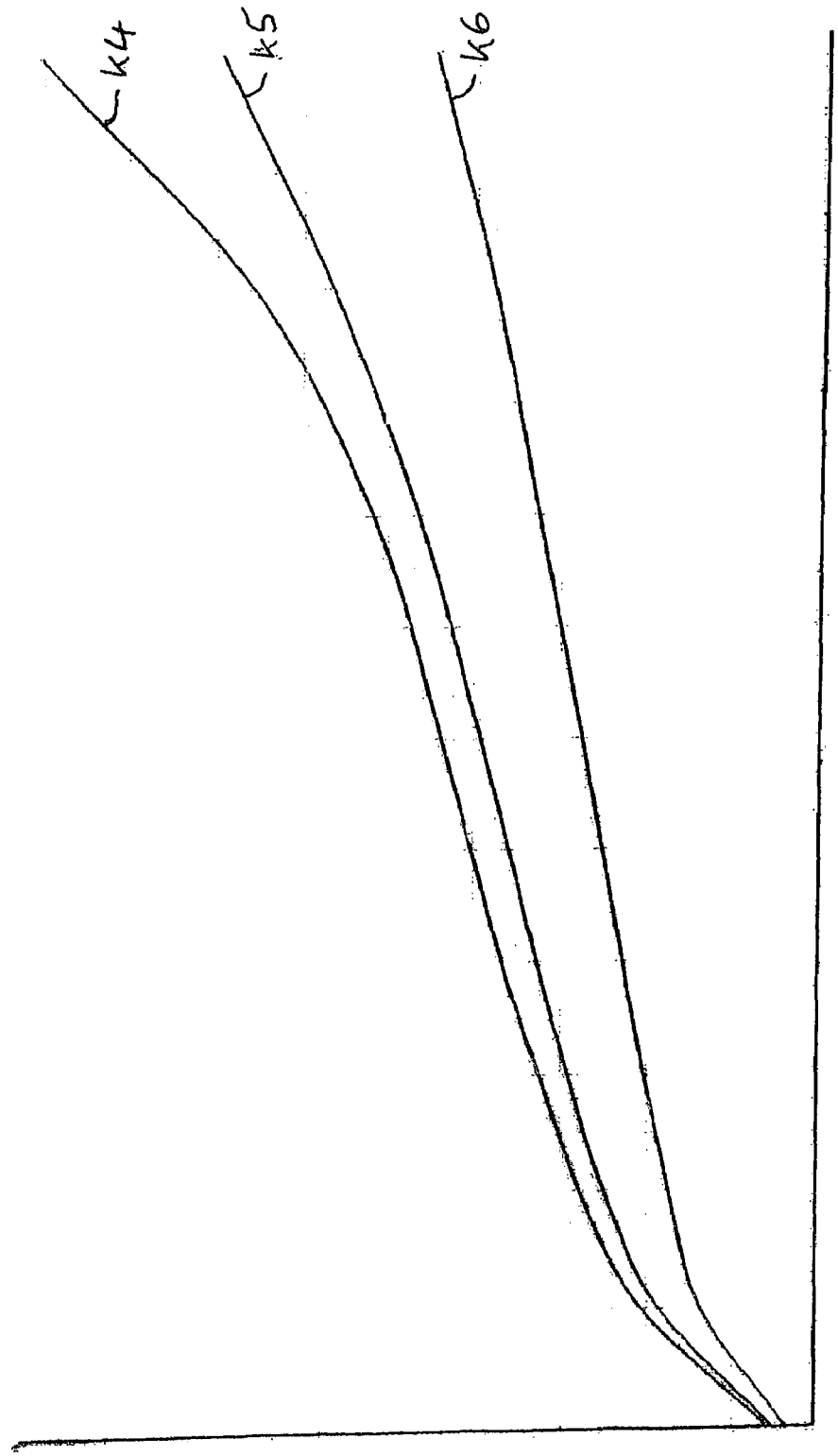

FIG. 8 are characteristic curve diagrams with force/path curves for various shock absorbers, that is, various response circumstances for a shock absorber;

FIG. 9 through

Figure 11:
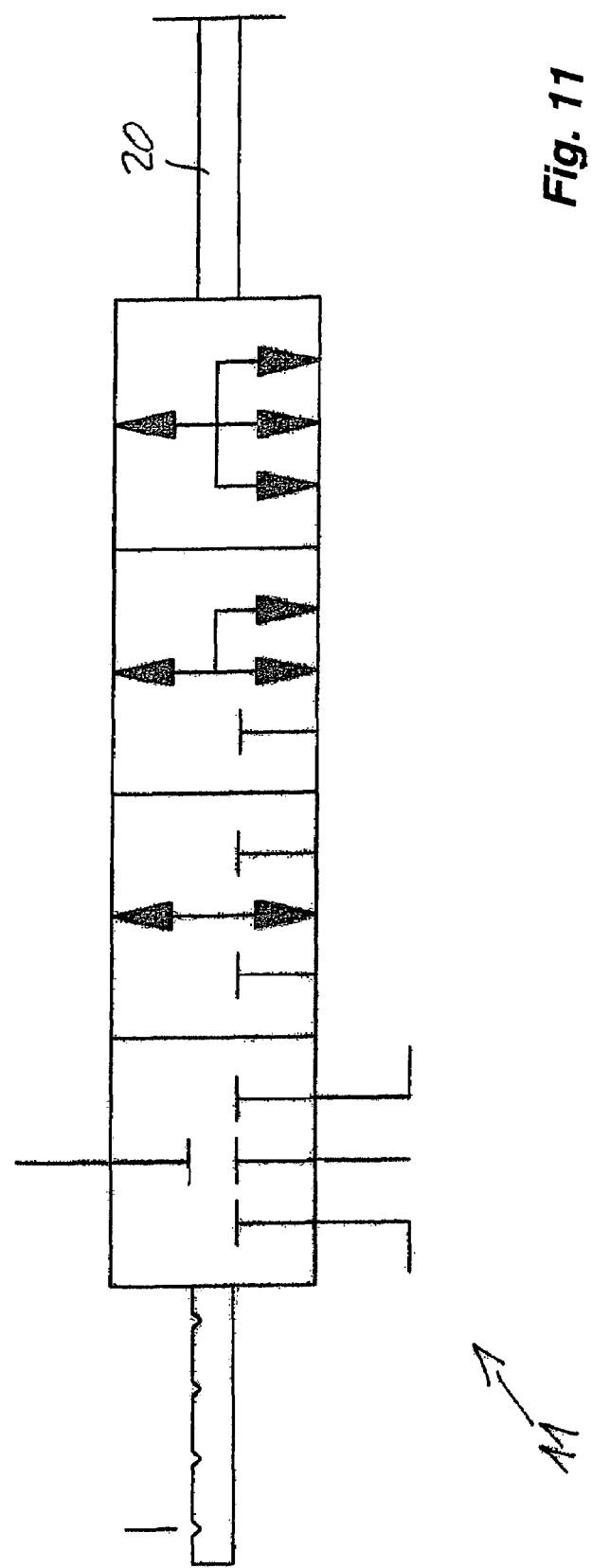

FIG. 11 illustrate principle diagrams for switch apparatus for the communicating channel;

FIG. 12 and

Figures 12, 13:
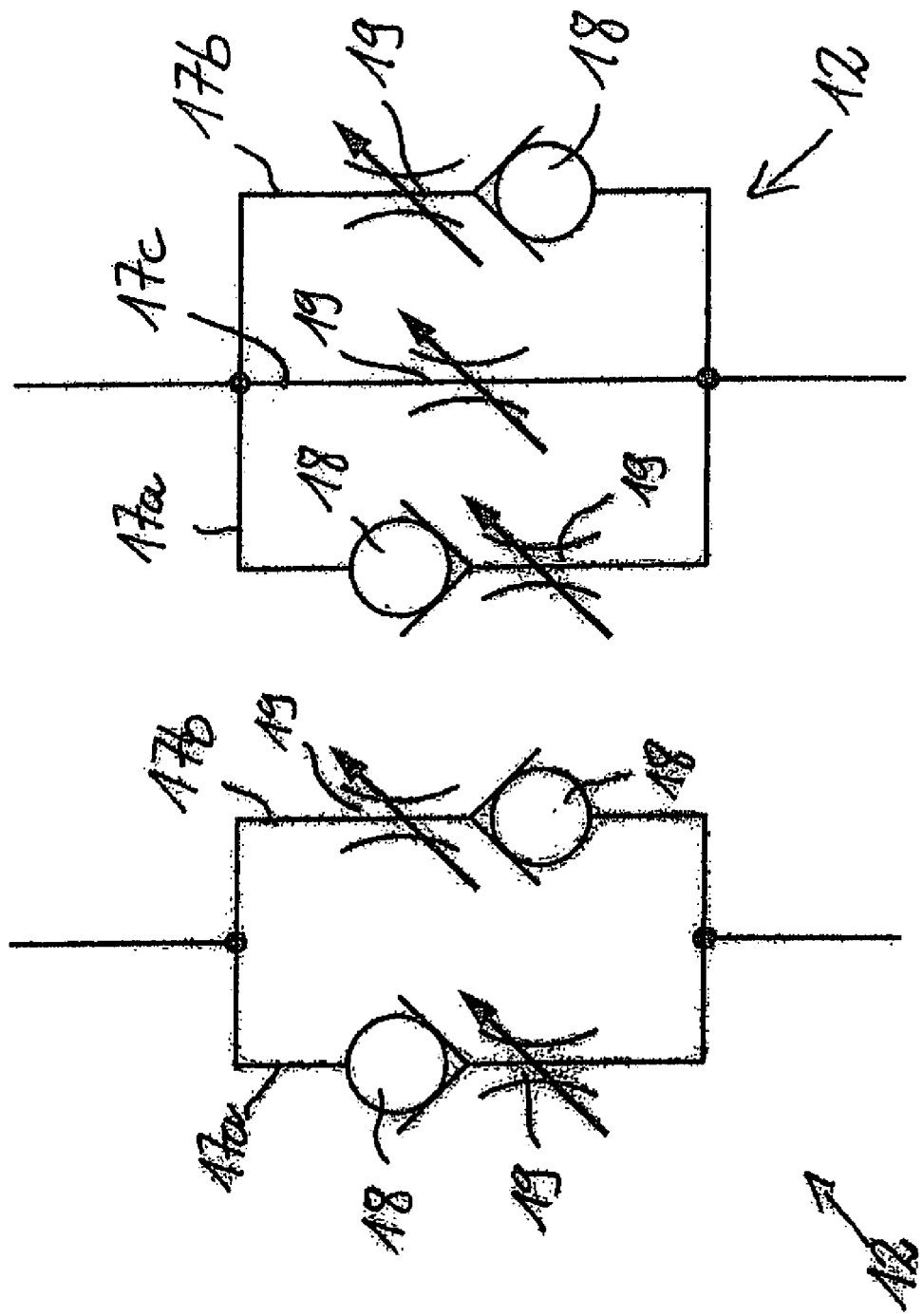

FIG. 13 illustrate principle diagrams for damping apparatus for the communicating channel;

FIG. 14 through

Figure 19:
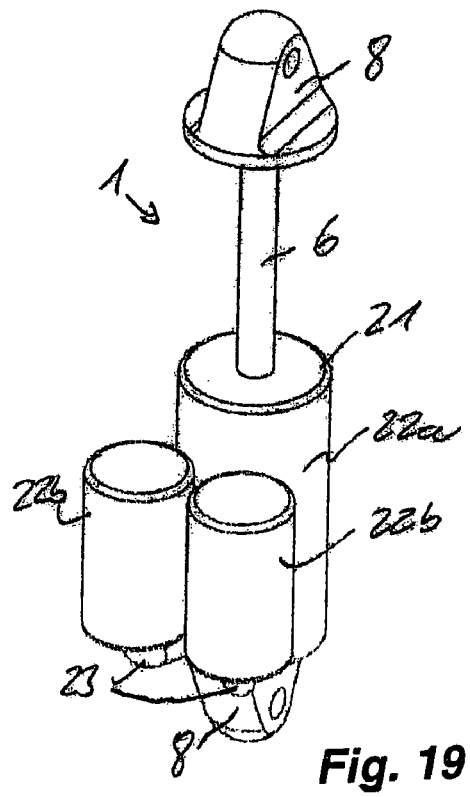
Figure 20:
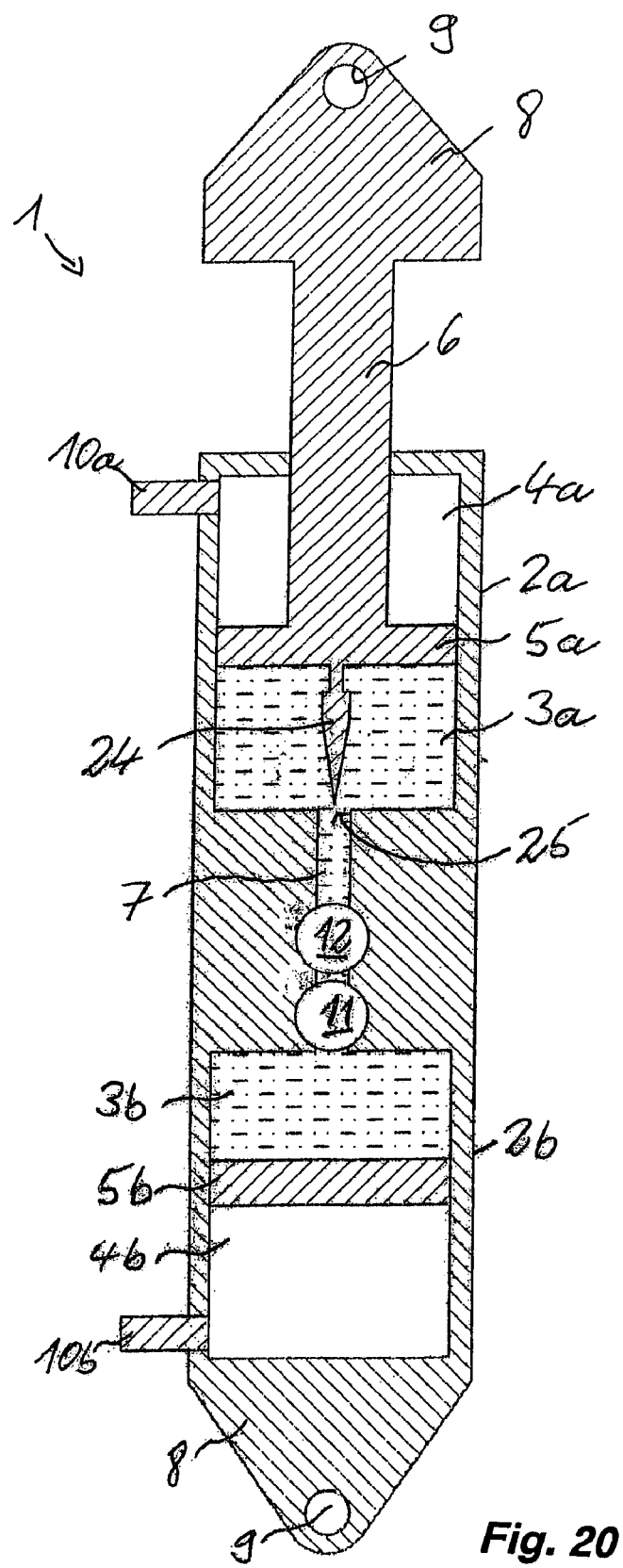
Figure 21:
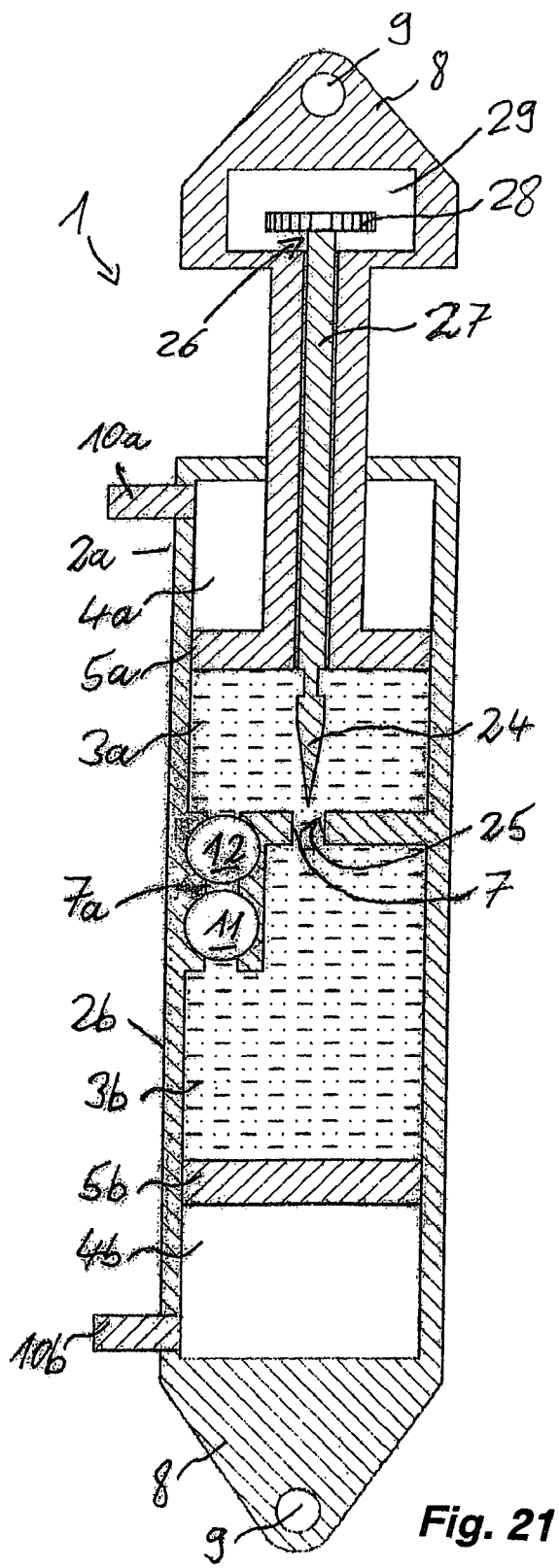

FIG. 19 are perspective elevations of various housing forms for inventive shock absorbers;

FIG. 20 is a sectional representation of a shock absorber that has an injection needle that is drive-linked to the piston rod;

FIG. 21 is a representation similar to that in FIG. 20, whereby an additional communicating channel is provided for the switch apparatus and the damping apparatus, and in which the injection needle is adjustably borne on the piston rod.

FIG. 22 through

Figure 28:

FIG. 28 illustrate various embodiments of an injection needle.

Figure 2:
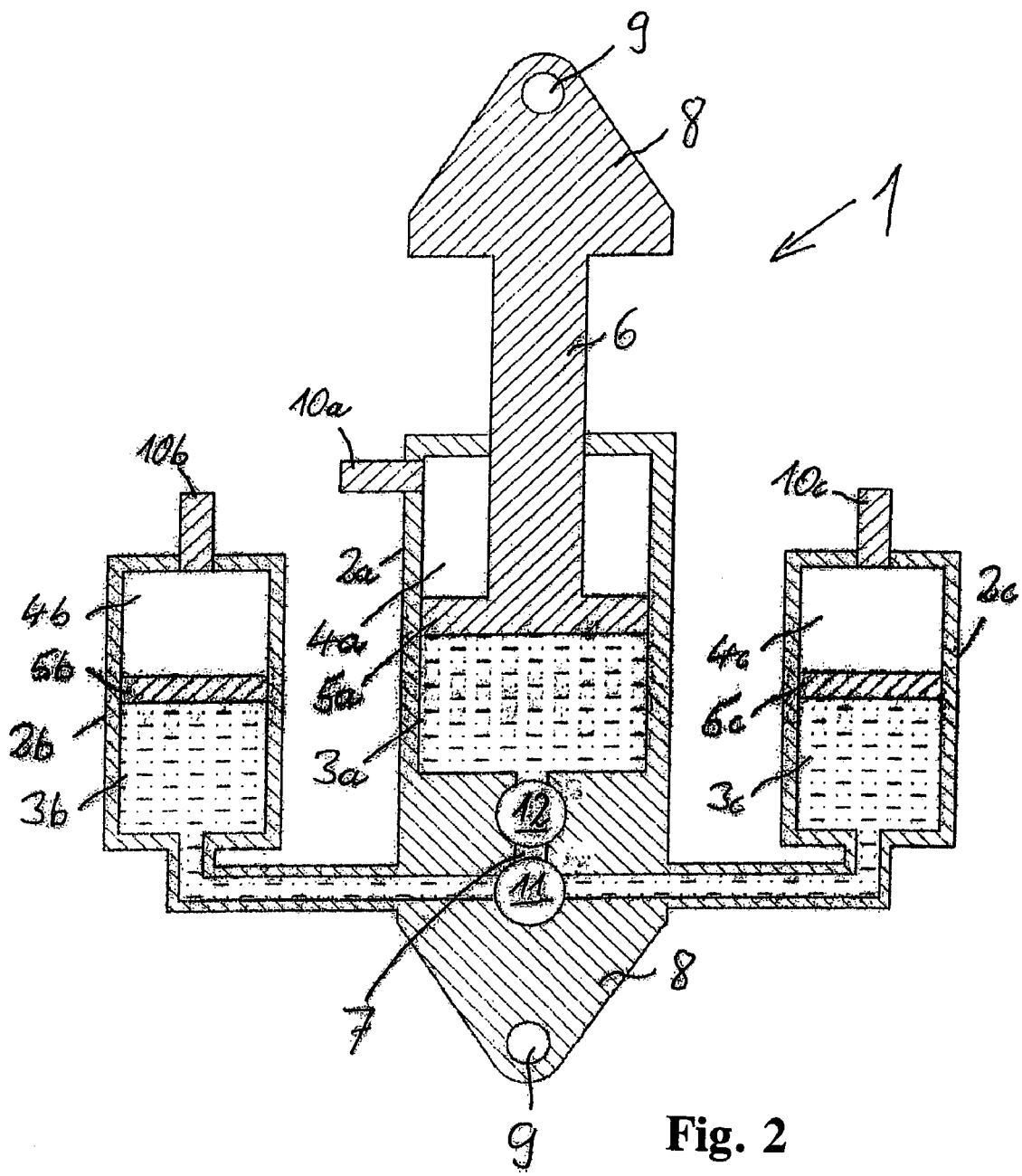
FIG. 2 is a sectional representation of an inventive shock absorber with a third cylinder, a switch apparatus, and a damping apparatus.
Figure 29:
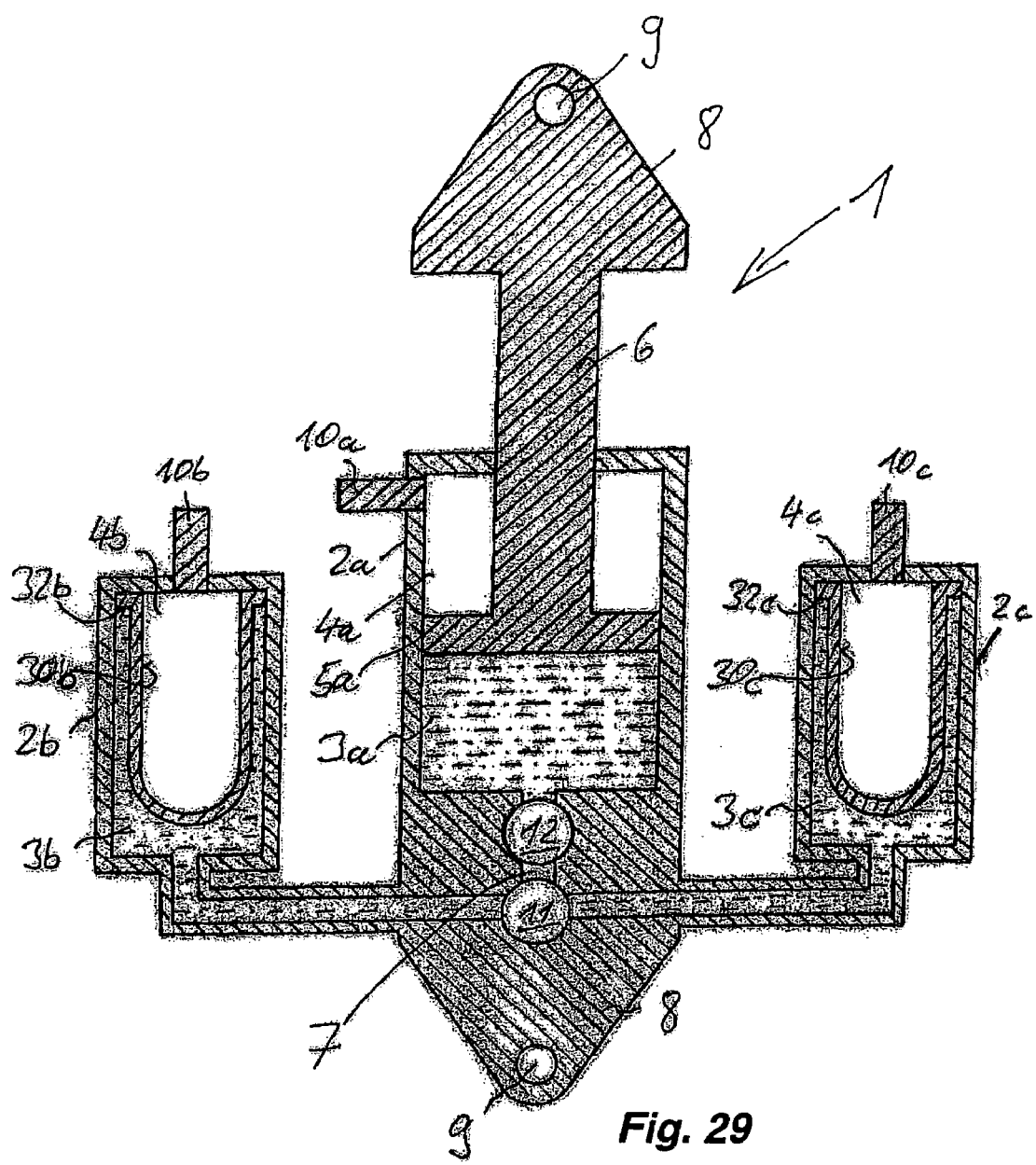
Figure 30:
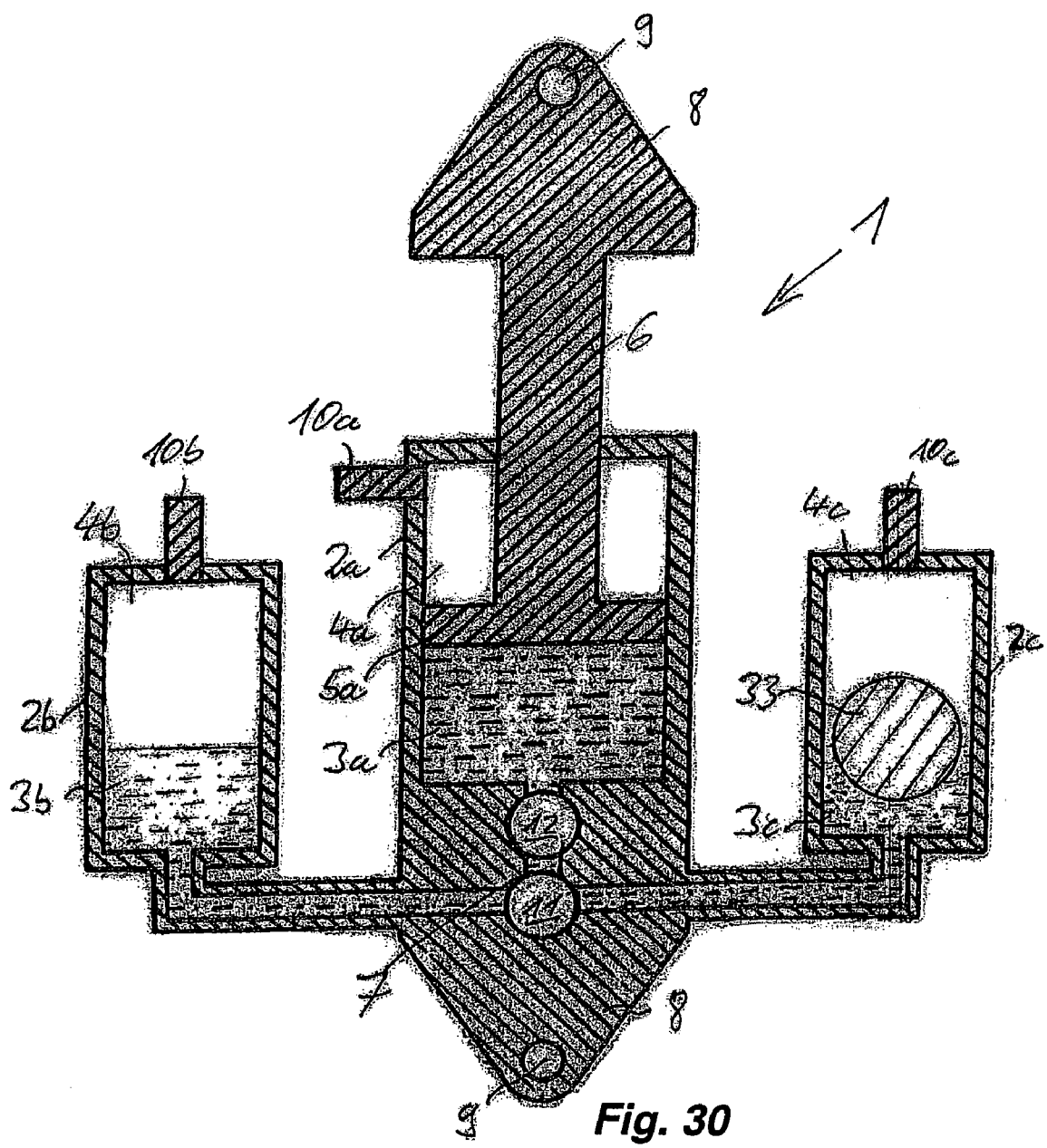
Figure 31:
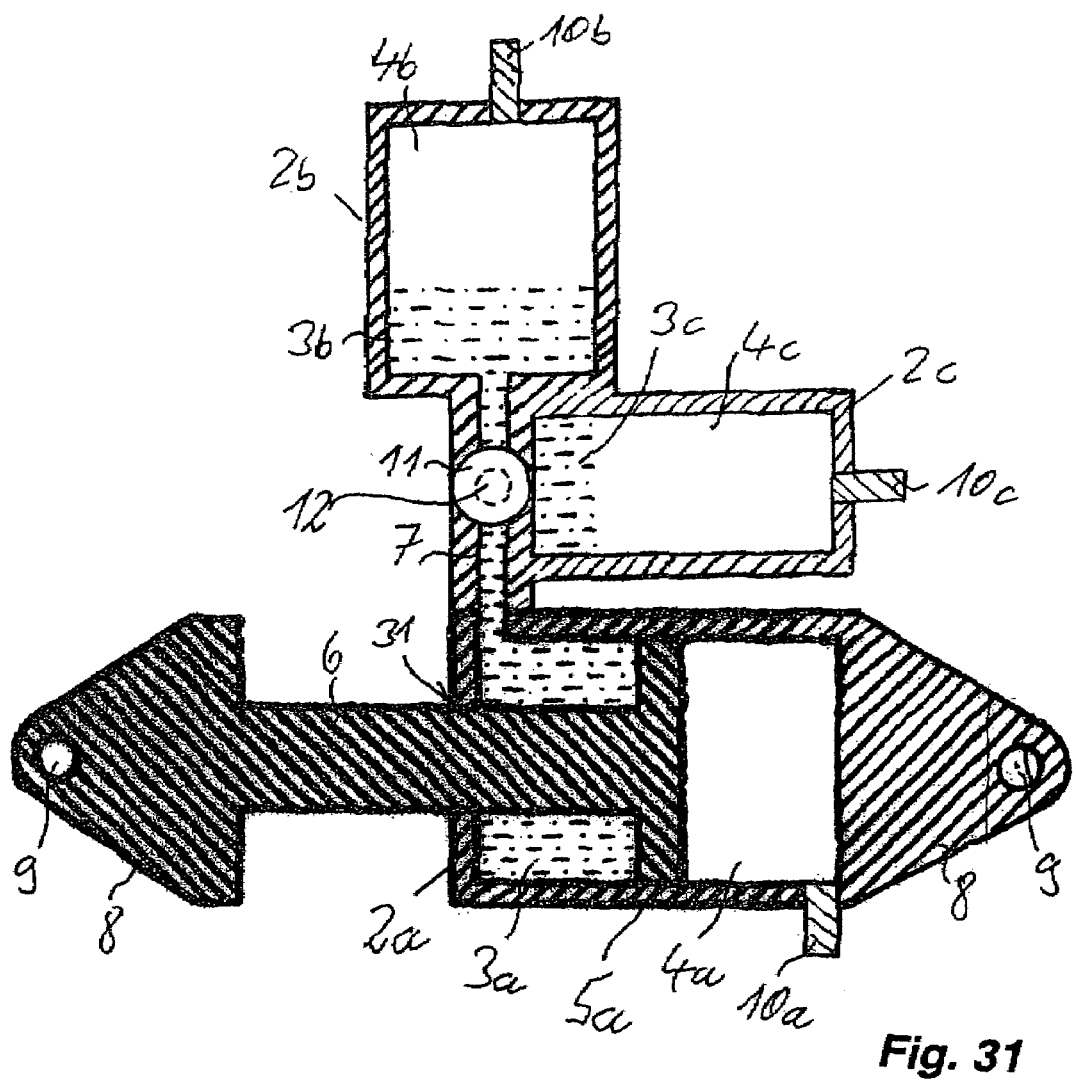

FIG. 29 illustrates a shock absorber similar to the shock absorber in accordance with FIG. 2, whereby the second and third cylinder each have a diaphragm between the fluid chamber and the gas pressure chamber;

FIG. 30 illustrates a shock absorber similar to the shock absorber in accordance with FIG. 29, whereby the second and third cylinders each have a direct fluid/gas transition; and, FIG. 31 illustrates a shock absorber embodied as a pull shock element.

Figure 1:
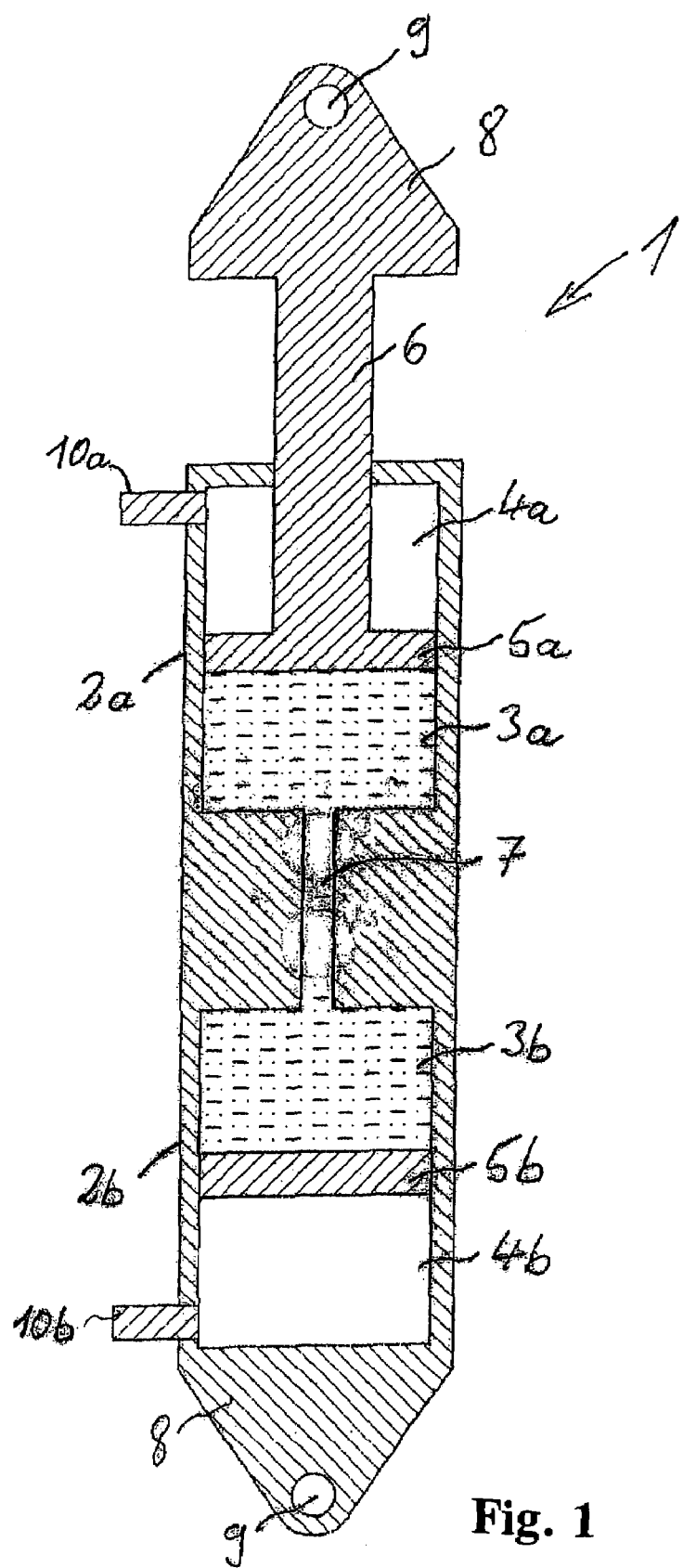
FIG. 1 is a sectional representation of a prior art shock absorber with a first cylinder and a second cylinder that communicate with one another via a communicating channel.

FIG. 1 illustrates a shock absorber 1 in accordance with the prior art. It has a first cylinder 2a with a fluid chamber 3a filled with a damping medium, for instance oil, and a gas pressure chamber 4a filled with air or gas. The fluid chamber 3a and the gas pressure chamber 4a are separated from one another by a separating piston 5a that is joined to a piston rod 6 that leads outward. A second cylinder 2b also has a with [sic] fluid chamber 3b and a gas chamber 4b filled with air or gas that are separated from one another by an axially displaceable separating piston 5b. The fluid chambers 3a, 3b of the two cylinders 2a, 2b communicate with one another via a communicating channel 7.

At each of its exterior end regions the shock absorber 1 has a shock absorber eye 8 with a mounting opening 9 with which the shock absorber can be arranged for instance between two frame parts of a bicycle (not shown). When an axial force acts on the piston rod 6, the separating piston 5a moves into the fluid chamber 3a of the first cylinder 2a and presses transmission or damping medium out of the fluid chamber 3a via the communicating channel 7 into the fluid chamber 3b of the second cylinder 2b. Since the liquid transmission or damping medium cannot be compressed, the separating piston 5b is moved into the gas pressure chamber 4b and the gas disposed therein is compressed. In doing so, the gas pressure in the gas pressure chambers 4a, 4b determines the compression behavior of the shock absorber 1. The gas pressure can be adjusted via a valve 10a, 10b in order to set a basic strength for the compression or damping of the shock absorber. In addition, the compression or damping behavior of this known shock absorber 1 cannot be changed during ongoing operation in order to be able adapt it for instance to different terrain situations.

FIG. 2 illustrates an embodiment of an inventive shock absorber 1 that has an additional third cylinder 2c and a symbolically represented switch apparatus 11 arranged in the region of the communicating channel 7 between the individual fluid chambers 3a, 3b, 3c and a damping apparatus 12. The communicating channel 7 can be opened and closed using the switch apparatus 11 (see also FIG. 10). The switch apparatus 11 can be set such that the fluid chamber 3a of the first cylinder 2a is selectively in flow communication with one of the two fluid chambers 3b, 3c of the other cylinders 2b, 2c, with both fluid chambers 3b, 3c simultaneously, or with neither of the two fluid chambers 3b, 3c. Depending on the setting of the switch apparatus, given the effect of an axial force on the piston rod, the transmission or damping medium can escape into the second cylinder 2b, the third cylinder 2c, both cylinders 2b, 2c, or neither of cylinders 2b, 2c. The compression behavior of the shock absorber 1 changes correspondingly so [compression behavior] that it can be modified as needed in the operation of the shock absorber 1.

Figure 7:
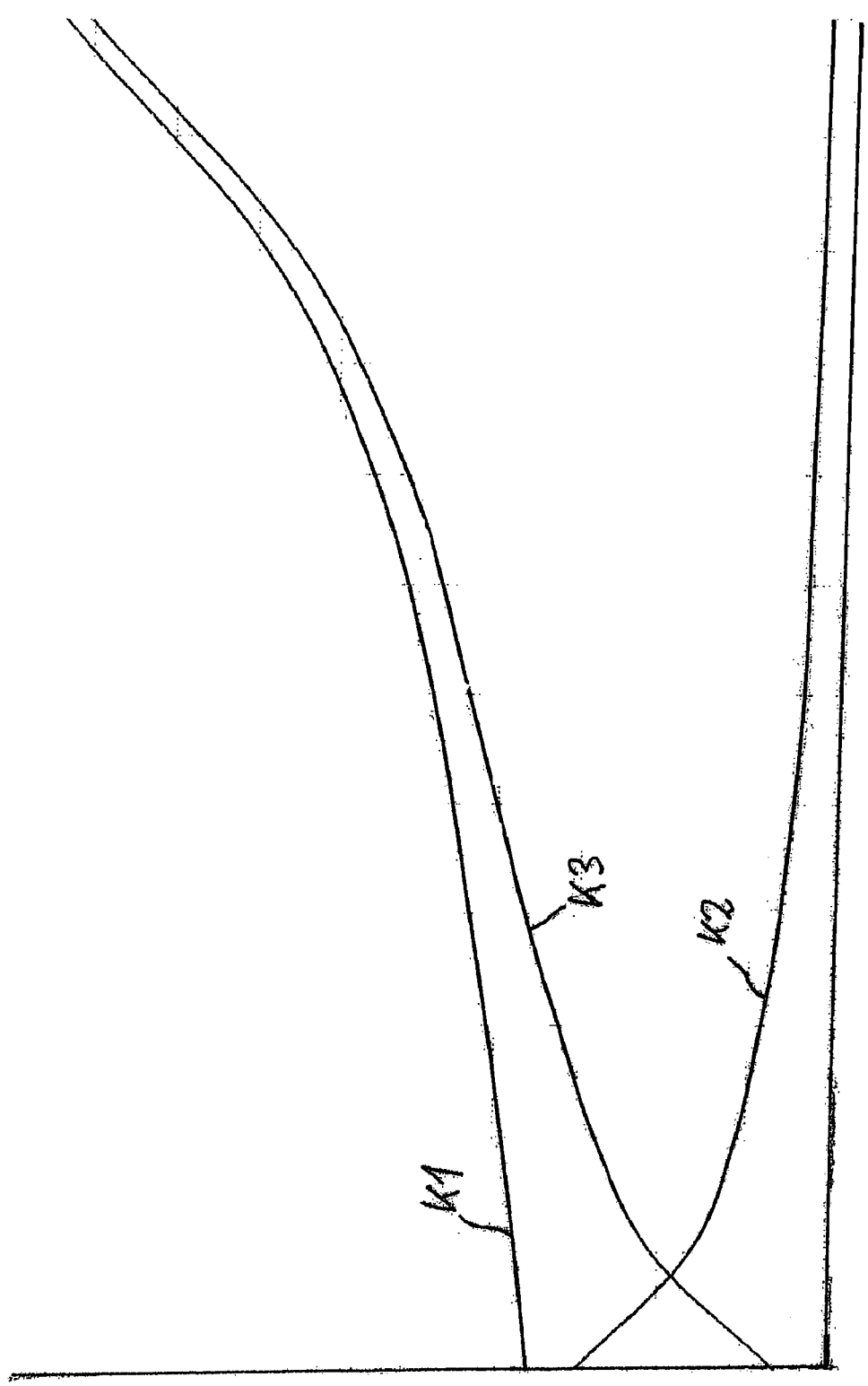

FIG. 7 illustrates characteristic force/path curves for the different areas of a shock absorber. The travel of the piston rod is shown on the X-axis and the force required to displace the piston rod is shown on the Y-axis. The curve K1 illustrates the force required depending on the piston stroke path for a shock absorber that has only one positive chamber, that is, one gas pressure chamber 4b. A high initial force is required to compress the gas volume in the positive gas pressure chamber 4b so that the shock absorber does not react at all or reacts only minimally to small shocks.

Curve K2 results for a shock absorber that has only one negative chamber, that is, one gas pressure chamber 4a in the region of the piston rod 6. The negative chamber with the curve K2 has a high initial force in order to have the piston rod compress, and as piston rod moves in further, there is less force available for compressing the shock absorber even more.

By arranging the positive chamber and the negative chamber in the inventive shock absorber, these two curves act upon one another in a subtractive manner so that the curve K3 results. The shock absorber 1 responds even when the forces, that is, the shocks, are low, which would be the case in shock absorbers without negative chambers since first an initial pressure must be overcome.

FIG. 8 illustrates characteristic curves for shock absorbers with one (K4), two (K4, K5), or three (K4, K5, K6) positive chambers, that is, gas pressure chambers 4b, 4c, 4d. By connecting additional cylinders 2b, 2c, 2d, that is, their fluid chambers 3b, 3c, 3d, to the communicating channel 7, it is thus possible to achieve softer compression, and by blocking the communicating channel 7 using the switch apparatus 11 it is possible to achieve harder compression.

Thus, in the shock absorber 1 in accordance with FIG. 2, characteristic curves in accordance with the curve K4 (communicating channel 7 opened to one of the fluid chambers 3b, 3c) or K5 (communicating channel 7 opened to both fluid chambers 3b, 3c) can be set by means of the switch apparatus 11. The shock absorber is blocked when the communicating channel 7 is completely closed.

The damping chambers 4a, 4b, 4c each have a valve 10a, 10b, 10c via which the gas pressure can be adjusted in the respective gas chamber when the shock absorber is at rest. If there is different pressure in the two gas pressure chambers 4b, 4c, a different characteristic curve results and thus different compression behavior, depending on which of the two cylinders 2b, 2c is connected.

Thus, four compression conditions result for the shock absorber 1 in accordance with FIG. 2, which conditions can be selectively chosen during operation, for instance while riding the bicycle, using the switch apparatus. For this purpose the switch apparatus is preferably connected to a control device (not shown in greater detail). It can for instance have a manual lever, an adjuster wheel, or a similar manually actuatable handle arranged on the handlebar. It is also possible to provide an automatic control that has for instance a computer control that is connected to a speedometer arranged in the region of the wheel to be cushioned, and the compression behavior is automatically controlled corresponding to the wheel motions. Control using other sensors, for instance inclination sensors, is also possible.

The flow of the transmission or damping medium in the pressure or pull stage, that is, as the piston rod 6 moves in or out of the first cylinder 2a, can be controlled using the damping apparatus 12. FIGS. 12 and 13 illustrate functional illustrations for two possible embodiments of the damping apparatus 12.

FIG. 12 illustrates a damping apparatus 12 with two flow paths 17a, 17b for the pressure or pull stage of the shock absorber 1. One non-return valve 18 and one throttle element 19 are included in each of the flow paths 17a, 17b. The non-return valves permit flow of the transmission or damping medium only in one direction in each of the two flow paths 17a, 17b. Thus, the cross-section in the flow paths 17a, 17b can be adjusted separately for the pressure stage and the pull stage using the throttle elements 19 in order to make it possible for the pressure stage and the pull stage to have different damping behavior. The throttle elements 19 of the damping apparatus 12 can also be connected to a control device (not shown) that has for instance a handle arranged on the bicycle handlebar in order to be able to adapt the damping behavior of the shock absorber to the current environment while riding the bicycle. It is possible for a common handle to be provided for the damping apparatus 12 and the switch apparatus 11, which renders operating the inventive shock absorber particularly simple and ergonomic.

The damping apparatus 12 in accordance with FIG. 13 has an additional third flow path 17c that also has a throttle element 19 but that does not have a non-return valve. This permits base damping to be set that is effective both in the pressure stage and in the pull stage. In addition, the damping behavior can be adjusted separately for the pressure stage and the pull stage using the throttle elements 19 in the flow paths 17a, 17b.

As can clearly be seen in FIG. 2, the separating pistons 5b, 5c of the second and third cylinder 2b, 2c have a smaller cross-section than the piston 5a of the first cylinder 2a. This does not have a negative effect on the compression and damping behavior of the shock absorber 1, since the force exerted on the piston 5a via the fluid depends only on the pressure in the gas pressure chambers 4b, 4c, but not on the surface area of the separating piston 5b, 5c. The space required for the shock absorber 1 is reduced in an advantageous manner, which is particularly favorable for employment in environments with limited available space, for instance on bicycle frames.

Figure 3:
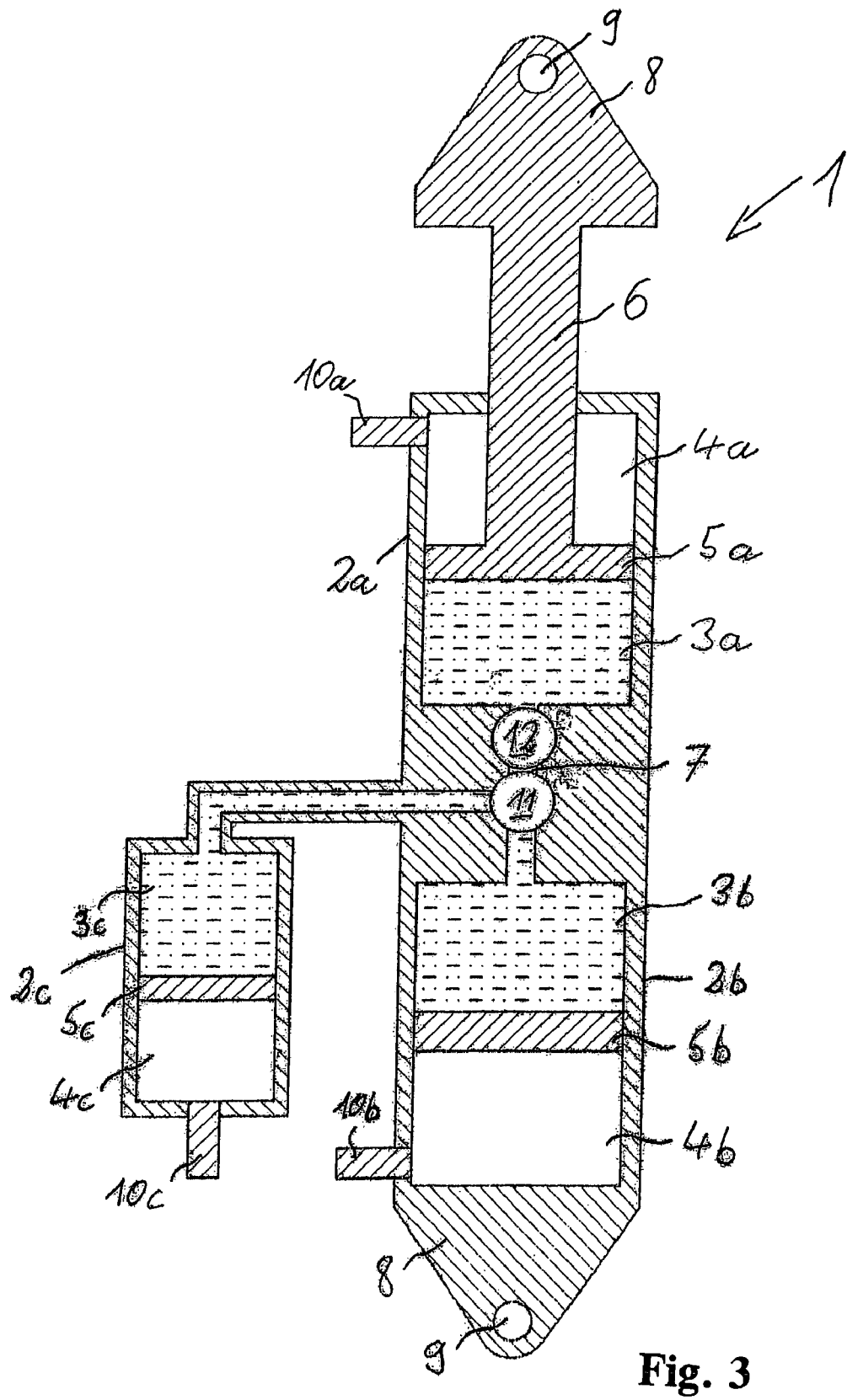
FIG. 3 illustrates a shock absorber similar to the representation in accordance with FIG. 2, but with an asymmetrical mechanical structure.

The shock absorber 1 in accordance with FIG. 3 largely corresponds to the embodiment in FIG. 2. Only the mechanical structure and the geometrical arrangement of the cylinders 2b, 2c have been modified.

In such an arrangement, in which the first cylinder 2a and a second cylinder 2b are arranged one after the other in the longitudinal direction, contrary to the representation shown, the separating piston 5b of the second cylinder 2b can also have a cross-section that is larger than the cross-section of the piston 5a of the first cylinder 2a. In contrast, the second cylinder can also be designed shorter in terms of its axial length so that the entire longitudinal extension of the shock absorber 1 is reduced without this affecting the damping and compression behavior of the shock absorber 1. This can be advantageous when using the shock absorber 1 in environments with constrained available space.

On the other hand, shock absorbers are possible in which the separating piston 5b of the second cylinder 2b has a cross-section that is smaller than the cross-section of the piston 5a of the first cylinder 2a. In this manner the shock absorber can be designed narrower, at least in the area that receives the second cylinder 2b.

Figure 4:
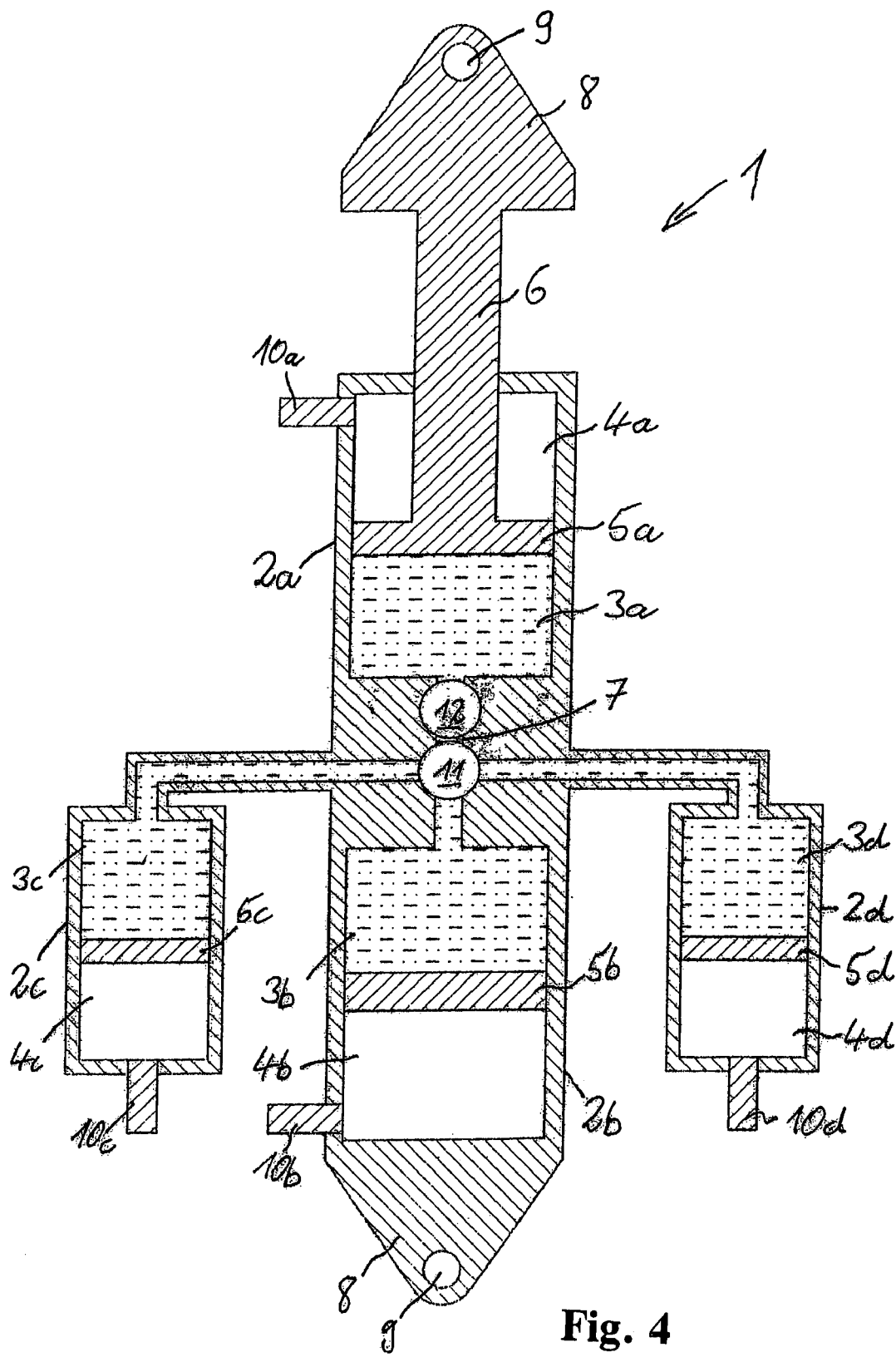
FIG. 4 illustrates a shock absorber similar to the representation in accordance with FIG. 3, with an additional third cylinder.

Compared to the shock absorber in accordance with FIG. 3, the shock absorber 1 in accordance with FIG. 4 is provided with another cylinder 2d that enables additional adjustment options for the compression behavior using appropriate control of the switch apparatus 11 (characteristic curve K6 in accordance with FIG. 8).

Figure 5:
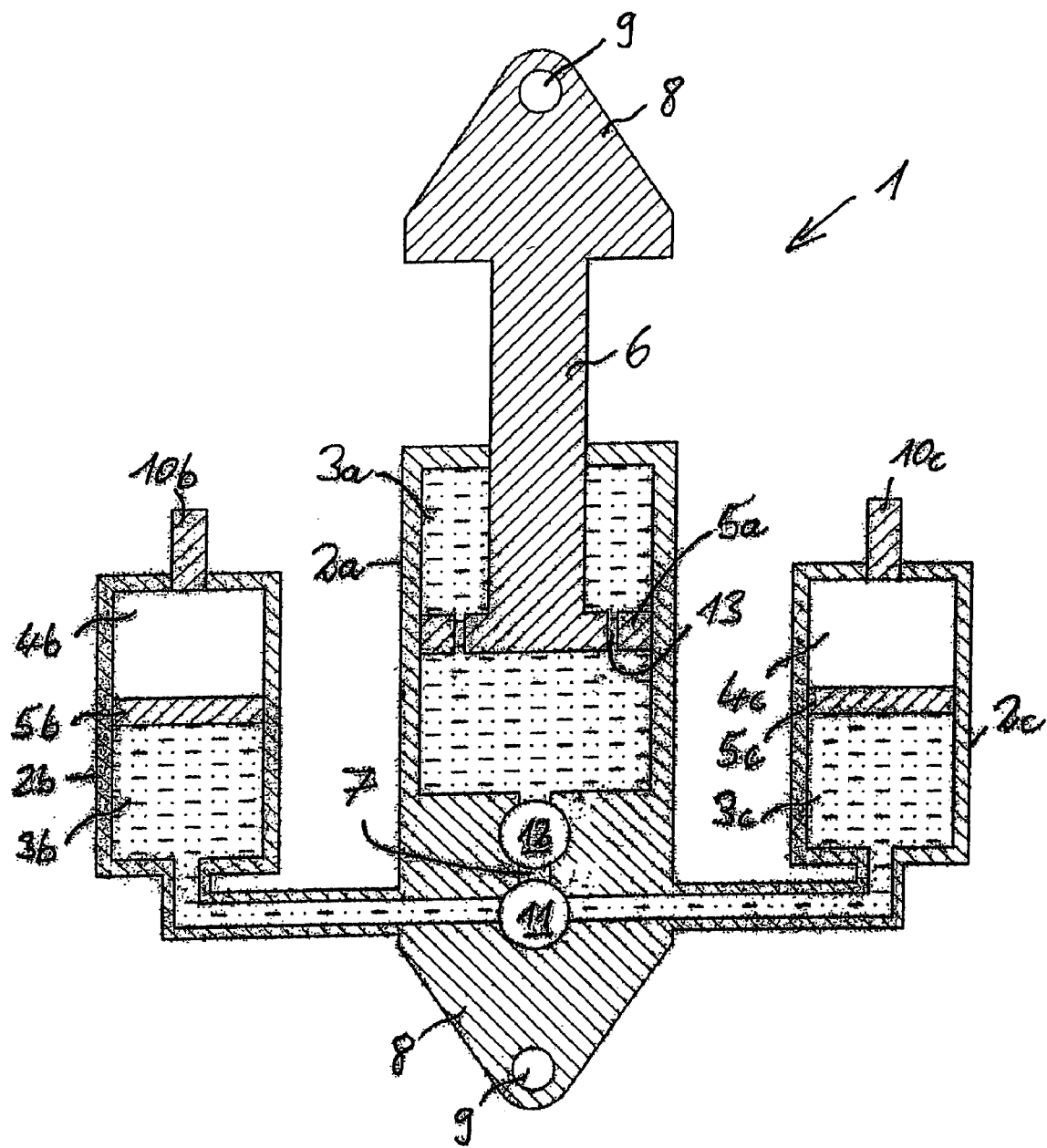
FIG. 5 illustrates a shock absorber similar to the representation in accordance with FIG. 2, in which the piston of the first cylinder is guided in the fluid chamber.

The shock absorber in accordance with FIG. 5 is modified relative to the embodiment in accordance with FIG. 2 in that the first cylinder 2a has only one fluid chamber 3a filled with the transmission or damping medium, but does not have any gas-filled gas pressure chamber. The piston rod 6 is borne axially displaceable in the fluid chamber 3a and the piston 5a joined to the piston rod 6 is designed as a dashpot piston and has a through aperture 13 for the transmission means. In this arrangement, as well, the compression behavior of the shock absorber can be modified by connecting or cutting off the additional cylinders 2b, 2c to/from the communicating channel 7.

Figure 6:
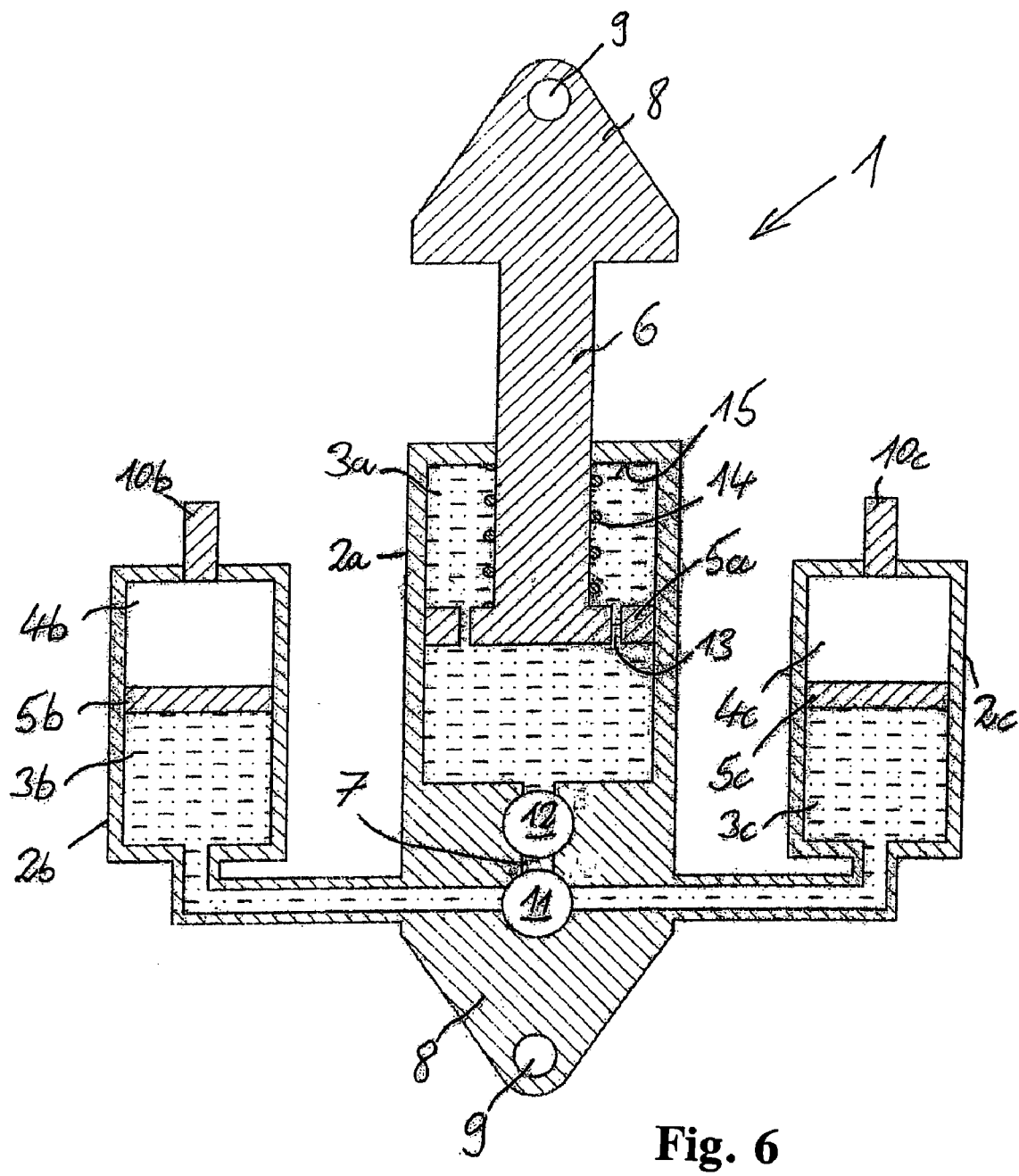
FIG. 6 illustrates the shock absorber in accordance with FIG. 5 with a negative spring in the region of the piston rod.

In FIG. 6, a negative spring 14 is additionally provided on the piston rod 6 between the piston 5a and one cylinder wall 16. This influences the characteristic curve of the shock absorber. The negative spring 14 assists in overcoming the initial pressure when the piston rod 6 is moving in, which causes the shock absorber to respond better to lighter shocks.

FIG. 29 illustrates a shock absorber 1 in which, in contrast to the shock absorber in FIG. 2, there is no separating piston in the second and third cylinders 2b, 2c, but rather elastically deformable diaphragms 30b, 30c are provided. In the illustrated exemplary embodiment, the diaphragms 30b, 30c are each designed like bladders and are attached to the side of the respective gas pressure chambers 4b, 4c of the cylinders 2b, 2c that faces away from the communicating channel 7, whereby the curvature is oriented toward the communicating channel 7. However, it is also possible to arrange for instance a flat, elastic diaphragm approximately in the center of each respective cylinder or to provide a diaphragm embodied as a bellows with which greater changes in volume are possible. The diaphragms 30b, 30a each form the line of separation between fluid chamber 3b, 3c and gas pressure chamber 4b, 4c. When the transmission or damping medium is displaced into the second and/or third cylinder 2b, 2c as the piston rod 6 moves into the first cylinder 2a, the respective diaphragm 30b, 30c is deformed so that the volume portion of the gas pressure chamber 4b, 4c is reduced in terms of the total interior volume of the cylinder 2b, 2c, while the volume of the fluid chamber 3b, 3c increases. The force required for this, that is, the required pressure of the transmission or damping medium, depends in particular on the gas pressure in the respective gas pressure chamber 4b, 4c, which can be adjusted via a valve 10b, 10c.

As can clearly be seen in FIG. 29, the diaphragms 30b, 30c each have a circumferential edge 32b, 32c that makes possible simple, positive-fit, and sealing assembly of the diaphragm 30b, 30c in the respective cylinder 2b, 2c.

The advantage the diaphragm has over a shock absorber with a separating piston is in particular that there are fewer demands on the surface quality of the interiors of the cylinders 2b, 2c since it is not necessary for a separating piston to be movably and simultaneously sealingly guided. Manufacture is thus simplified.

In the shock absorber 1 in accordance with FIG. 30, the points of separation between the fluid chambers 3b, 3c and the gas pressure chambers 4b, 4c of the second and third cylinders 2b, 2c are each formed by a direct fluid/gas transition. For this, the second and third cylinders 2b, 2c are arranged vertically in the illustrated position of normal use of the shock absorber 1, whereby the gas pressure chambers 4b, 4c are each arranged above the associated fluid chambers 3b, 3c. Thus, gravity automatically effects separation of gas and the heavier transmission or damping medium.

In this embodiment, as well, the design is simplified because there are no special demands on the surface quality of the cylinder interior and these are further reduced compared to the embodiment with diaphragms 30b, 30c in accordance with FIG. 29.

As the piston rod 6 moves into the cylinder 2a and when the switch and damping apparatus 11, 12 is open, transmission or damping medium is displaced through the communicating channel 7 into the fluid chambers 3b, 3c of the second and third cylinders 2b, 2c. Since there is no mechanical separation between the fluid chamber 3b and the gas pressure chamber 4b, the transmission or damping medium can bubble up into the gas pressure chamber 4b so that a transmission medium/gas mixture can form in a partial area of the cylinder 2b, which, in particular when the piston rod 6 subsequently moves out in the pull stage, can lead to undesired and uncontrolled fluctuations in the compression behavior if the transmission or damping medium has not completely resettled in the bottom area of the cylinder 2b.

In order to prevent the transmission or damping medium from bubbling up in this manner, provided in the third cylinder 2c is a spherical floating body 33, a partial volume of which is submerged in the transmission or damping medium. This minimizes the contact surface between transmission or damping medium and the gas in the gas pressure chamber 4c, largely prevents the transmission or damping medium from bubbling up in an uncontrolled manner, and thus largely prevents the transmission or damping medium from mixing with the gas so that no undefined compression properties can occur. Since the float body 33 floats freely on the transmission or damping medium, no special design properties are necessary for the float body 33 or the interior wall of the cylinder.

FIG. 31 illustrates a modified shock absorber 1 that acts as a "pull shock" element. The fluid chamber 3a of the first cylinder 2a is arranged between the piston 5a and the piston rod exit 31, and the communicating channel 7 opens at the end area of the first cylinder 2a that faces the piston rod exit 31 into its fluid chamber 3a. In this arrangement, damping or compressing occurs when the piston rod 6 is pulled out of the first cylinder 2a.

Using this arrangement, a "pull shock" shock absorber can be realized in a simple structure and can be designed very compact with a small size, which is particularly advantageous in bicycle construction.

Figure 9:
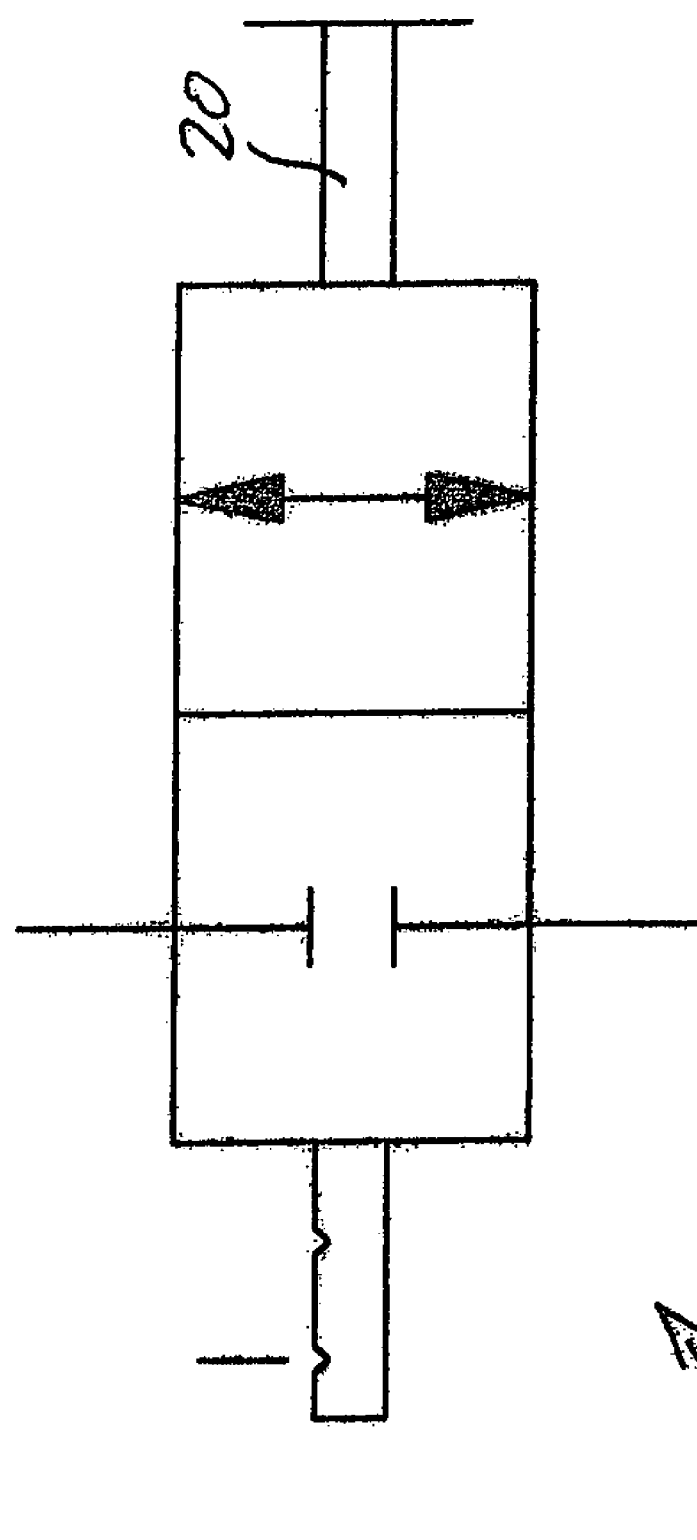
Figure 10:
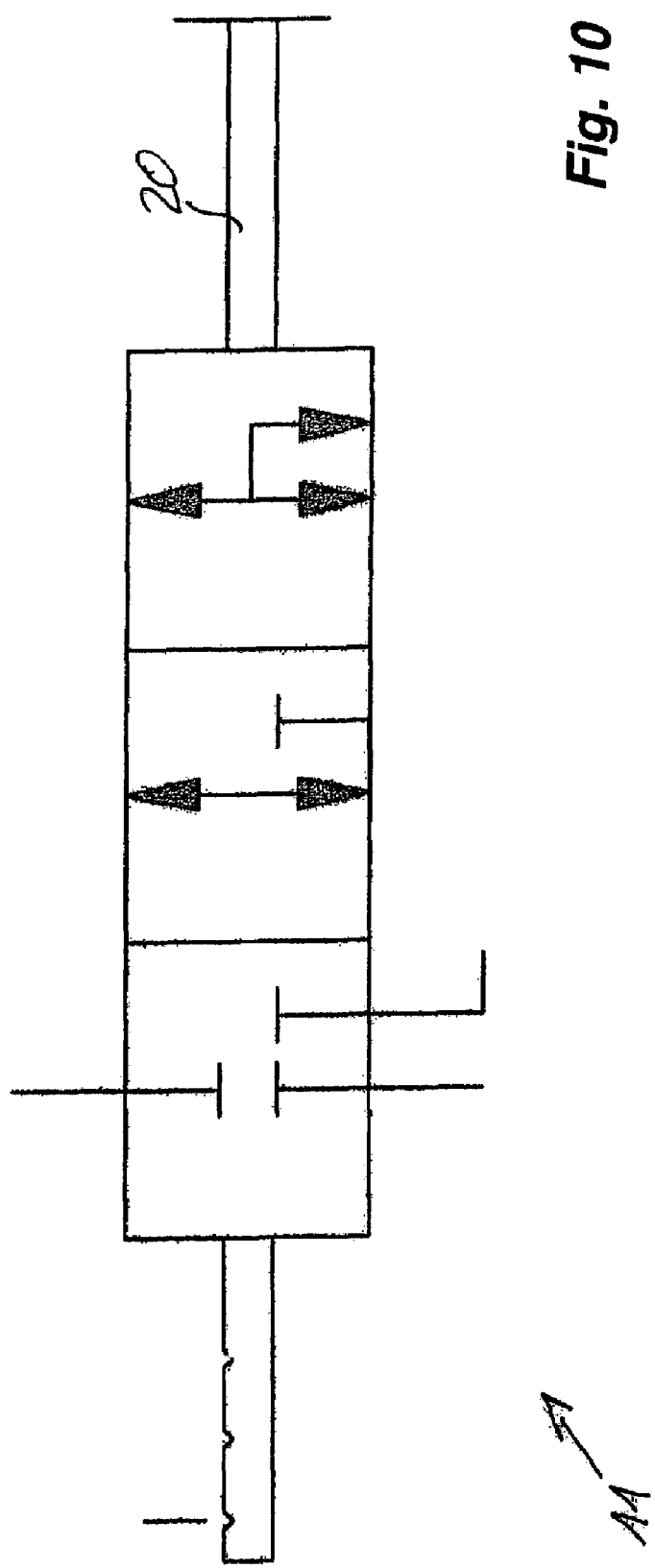
Figure 22:
Figure 23:
Figure 24:
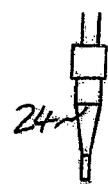
Figure 25:

FIGS. 9 through 11 provide functional illustrations of switch apparatus 11 with a plurality of switch conditions that can be set selectively using an actuating element 20. In the switch apparatus 11 illustrated in FIG. 9, a communicating channel can be switched to through-flow or completely interrupted. Such a switch apparatus 11 can be employed for instance in a shock absorber 1 in accordance with FIGS. 21 or 22. In the switch apparatus 11 illustrated in FIG. 10, a communicating channel with two branches can be controlled such that one or both branches are switched into the flow path. Such a switch apparatus 11 can be employed for instance in a shock absorber 1 in accordance with FIGS. 2, 3, 5, 6, 29, 30, or 31.

The switch apparatus 11 in accordance with FIG. 11 can furthermore switch a third branch in a communicating channel 7 in or out so that this embodiment is suitable for a shock absorber in accordance with FIG. 4.

FIGS. 14 through 19 illustrate different housings 21 for various embodiments of the inventive shock absorber 1. As can clearly be seen, in addition to the cylinders described in greater detail in the following, both the piston rod 6 and the shock absorber eyes 8 are for attaching the shock absorber 1 to a bicycle, for instance.

Figure 14:
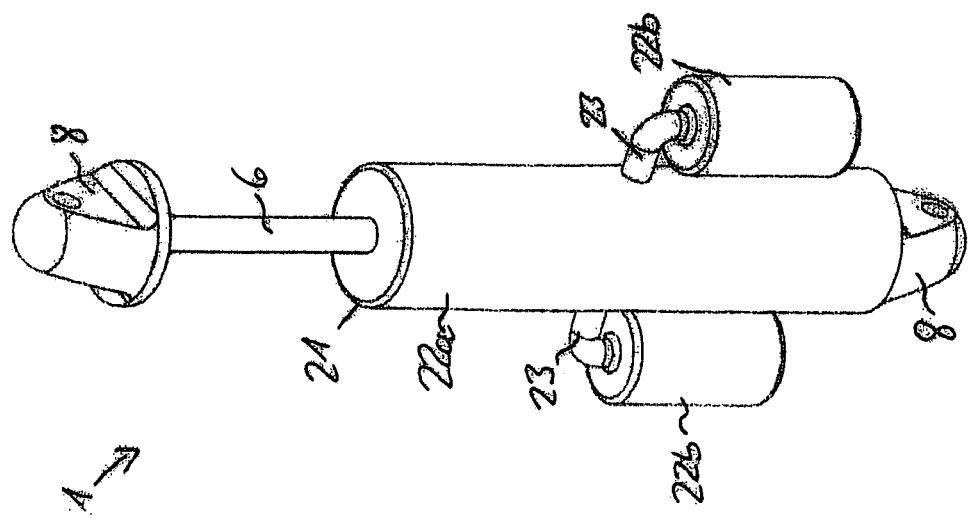

FIG. 14 illustrates a housing 21 for a shock absorber 1 in accordance with FIG. 4. The first cylinder 2a and the second cylinder 2b are disposed in a common cylinder housing part 22a, and the third cylinder 2c and the fourth cylinder 2d are formed by opposing cylinder housing parts 22b arranged laterally adjacent thereto, each of which communicates with the first cylinder housing part 22a via a communicating channel segment 23.

Figure 15:
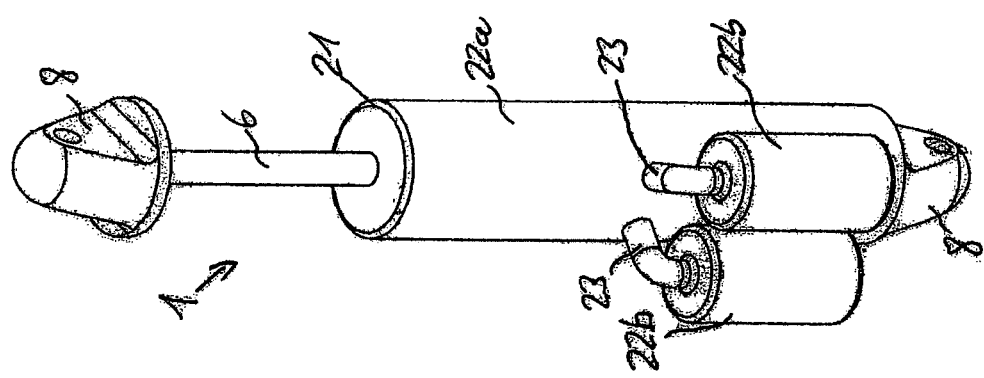

FIG. 15 illustrates a slightly modified embodiment in which the cylinder housing parts 22b are arranged next to one another. Depending on the field of use for the shock absorber 1, this can simplify installation and/or maintenance, for instance for adjusting the gas pressure in the gas pressure chambers.

Figure 16:
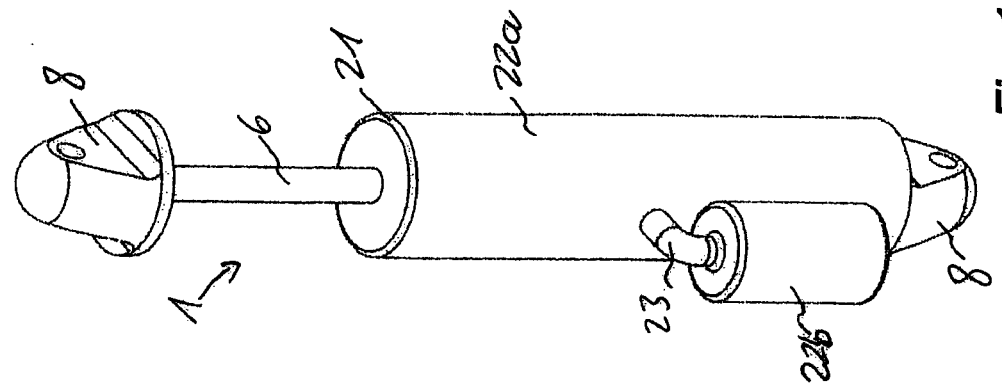

In addition to the first cylinder housing part 22a, the shock absorber 1 in accordance with FIG. 16 has only one additional cylinder housing part 22b and thus corresponds to a shock absorber in accordance with FIG. 3.

Figure 17:
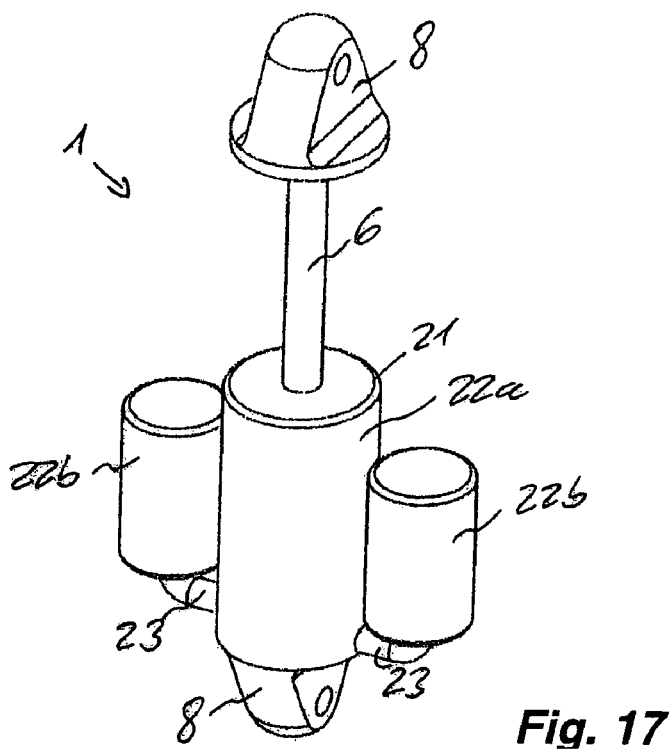
Figure 18:
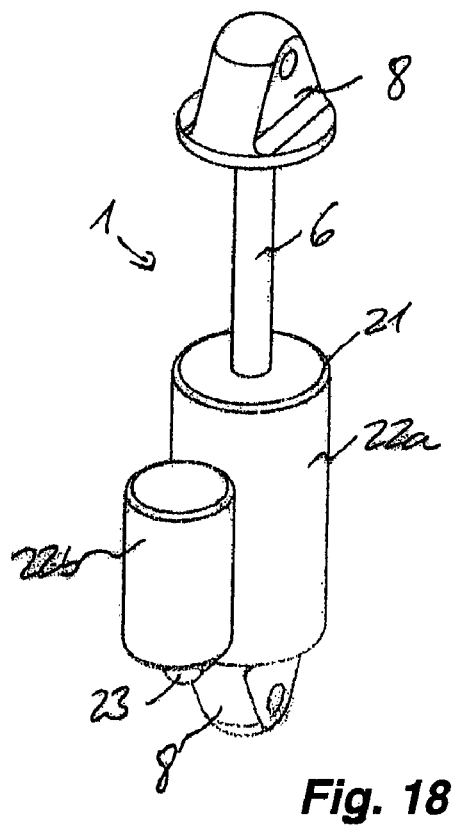

In FIGS. 17 through 19, only one cylinder 2a is disposed in the first cylinder housing part 22a, and the other cylinders 2b, 2c are each arranged in separate cylinder housing parts 22b. The housings 21 in accordance with FIGS. 17 and 19 correspond to the shock absorbers 1 in accordance with FIGS. 2, 5, 6, 29, and 30.

It can also clearly be seen that the cylinder housing parts 22b, determined by the smaller cross-sections of the cylinders 2b, 2c, have a smaller cross-section that the cylinder housing part 22a, which simplifies the arrangement of the shock absorber 1 on a bicycle for instance.

FIG. 18 illustrates a housing 21 with housing parts 22a, 22b for a shock absorber 1 with a total of two cylinders 2a, 2b, and is therefore suitable for shock absorbers in accordance with the prior art, similar to FIG. 1.

FIG. 20 illustrates a shock absorber 1 that has a first cylinder 2a and a second cylinder 2b, each of which has an air-or gas-filled gas pressure chamber 4a, 4b and a fluid chamber 3a, 3b filled with transmission or damping medium that is separated therefrom by a separating piston 5a, 5b. The fluid chambers 3a, 3b communicate with one another via a communicating channel 7. A switch apparatus 11 and a damping apparatus 12 are provided in the region of the communicating channel 7. The separating piston 5a of the first cylinder 2a communicates with an outwardly leading piston rod 6.

An injection needle 24 is arranged at the side of the separating piston 5a that faces the communicating channel 7. When the piston rod 6 moves into the first cylinder 2a, this injection needle 24 is inserted into the aperture area 25 of the communicating channel 7 that is designed as an injection needle receiving element, which changes the free cross-section through which the transmission or damping medium can escape out of the fluid chamber 3a into the communicating channel 7. This results in path-dependent damping behavior. Thus, with the injection needle 24 in accordance with FIG. 20 that has a cross-section that tapers to its free end, the free cross-section in the aperture area 25 of the communicating channel 7 grows continuously smaller the further into the cylinder 2a the piston rod 6 moves. The damping of the shock absorber 1 thus also increases as the piston rod 6 progresses inward. When there are light shocks to the shock absorber, that is, with slight force effects, the shock absorber thus exhibits slight damping; damping is high when there are larger force effects due to stronger shocks. The entire damping and compression behavior of the shock absorber 1 can be modified and adapted to the current external conditions during operation of the shock absorber 1, just as with the previously described embodiments, using a switch apparatus 11 and a damping apparatus 12.

FIG. 21 illustrates another expanded embodiment of the shock absorber 1 in accordance with FIG. 20, in which, in addition to the communicating channel 7 with the aperture area 25 embodied as injection needle receiving element for the injection needle 24, an additional communicating channel 7a is provided for the damping apparatus 11 and the switch apparatus 12. In addition, the piston rod 6 is designed as a hollow piston in which an adjusting device 26 with a spindle 27 is rotatably borne. On its end that submerges into the fluid chamber 3a of the first cylinder 2a the spindle carries the injection needle 24, and at its opposing end it carries an adjuster wheel 28 with which the spindle 27 can be rotated and thus axially displaced. Displacing the spindle 27 changes the distance from the injection needle 24 to the aperture area 25 of the communicating channel 7 when the shock absorber 1 is at rest. Thus the damping behavior can be changed depending on the force acting [thereupon].

The adjuster wheel 28 is arranged in a recess 29 of the shock absorber eye 8 so that the adjuster wheel 28 is accessible from the exterior and the damping behavior of the shock absorber can be adjusted simply and, for instance when using the shock absorber 1 on a bicycle, the desired compression or damping properties can be set.

Figure 26:
Figure 27:

FIGS. 22 through 28 illustrate various injection needles 24 that result in different characteristic force/path curves for the shock absorber. A constantly increasing force/path curve results with the injection needles 24 that taper to their free end (FIGS. 22 through 25). The injection needles 24 in accordance with FIGS. 26 through 28 can thus be employed in the shock absorber 1 such that their free end in the rest position submerges into the communicating channel and closes the aperture area 25 of the communicating channel 7 and does not release the piston rod 6 until after a certain travel and as the travel increases further reduces the free cross section (FIGS. 27, 28) or enlarges the free cross-section (FIG. 26). High initial force is required with each of these injection needles 24 so that the shock absorber responds, that is, the shock absorber remains inactive for weak shocks and does not become effective until larger force effects, for instance when riding over very uneven terrain.

Of course, the shock absorbers 1 in accordance with FIGS. 20 and 21 can also be equipped like the shock absorbers in accordance with FIGS. 2 through 6 with additional cylinders and appropriate switch and damping apparatus in order to make possible additional adjustment options for damping and compression behavior.

In the shock absorbers illustrated herein, the damping apparatus 12 is upstream of the switch apparatus 11. However, it is also possible for the damping apparatus 12 to be downstream of the switch apparatus 11 or for a damping apparatus 12 to be interposed in each of the channel segments of the communicating channel 7 leading to the second and third cylinders 2b, 2c.

The invention claimed is:

1. An adjustable shock absorber having selectable behavior characteristics, comprising:
   a first cylinder having a fluid chamber filled with a transmission or damping medium and a compressible chamber and in which an outwardly leading piston rod with a piston for receiving shocks to be damped or compressed is axially displaceable within the first cylinder;
   a second cylinder having a fluid chamber filled with the transmission or damping medium and an air-filled or gas-filled gas pressure chamber, said fluid chambers of said first and second cylinders being connectable with one another via a communicating channel;
   at least one additional cylinder having an air-filled or gas-filled gas pressure chamber and a fluid chamber filled with the transmission or damping medium, said fluid chambers of each said additional cylinders being connectable to said fluid chambers of said first and second cylinders via at least said communicating channel; and
   at least one switch apparatus located at least partly in the communicating channel for blocking or releasing communication between said fluid chamber of said first cylinder and at least one of said fluid chambers of at least one of said second and said additional chambers to select on of a plurality of different shock absorber behavior characteristics.

2. Shock absorber in accordance with claim 1, wherein said air-filled or gas-filled gas pressure chamber and said transmission-filled or damping-medium-filled-fluid chamber of said second and any said additional cylinders are each separated from one another by axially displaceable respective separating piston.

3. Shock absorber in accordance with claim 2, wherein at least one of said separating pistons has a smaller cross-section than said piston of said first cylinder.

4. Shock absorber in accordance with claim 2, wherein at least one of said separating pistons has a larger cross-section than said piston of said first cylinder.

5. Shock absorber in connection with claim 1, wherein a point of separation between a respective said fluid chamber and a respective said gas pressure chamber of at least one of said second cylinder, and any said additional cylinders is formed by a direct fluid gas transition and said gas pressure chamber of each said cylinder is arranged in an operating position of said shock absorber above said fluid chamber.

6. Shock absorber in accordance with claim 1 or 2, wherein a float body is provided in a transition region between each said air-filled or gas-filled gas pressure chamber and each said transmission-filled or damping-medium-filled fluid chamber of at least one of said second cylinder and any said additional cylinders.

7. Shock absorber in accordance with claim 1 or 2, wherein said compressible chamber in said first cylinder includes a spring that is pressure-actuated when said piston rod of the first cylinder moves within said first cylinder.

8. Shock absorber in accordance with claim 1 or 2, wherein said compressible chamber in said first cylinder is an air-filled or gas-filled gas pressure chamber and the fluid chamber filled with the transmission or damping medium is separated from said air-filled or gas-filled pressure chamber by a separating piston that is axially displaceable.

9. Shock absorber in accordance with claim 1 or 2, wherein provided in the region of said communicating channel is a damping apparatus for adjustment of the flow-through cross-section between said fluid chamber of said first cylinder and said fluid chambers of said second and said additional cylinders.

10. Shock absorber in accordance with claim 9, wherein said damping apparatus has flow paths, separate from one another and that can be adjusted independent of one another, for a pressure stage and a pull stage of said shock absorber.

11. Shock absorber in accordance with claim 1 or 2, wherein said gas pressure chambers each have an outward-leading valve for adjusting the air or gas pressure in each said gas pressure chamber.

12. Shock absorber in accordance with claim 8, wherein an air-filled or gas-filled gas pressure chamber is provided that communicates with said gas pressure chamber of said first cylinder via a communicating channel and in the area of said communicating channel a switch apparatus is provided for opening or closing said communicating channel.

13. Shock absorber in accordance with claim 9, wherein said switch apparatus and/or said damping apparatus are each connected to a control device for manual or automatic adjustment of switch status of said switch apparatus and/or said damping apparatus.

14. Shock absorber in accordance with claim 9, wherein an operating element that can be positioned in the region of a bicycle handlebar is connected to said switch apparatus and/or to said damping apparatus for manual operation.

15. Shock absorber in accordance with claim 13, wherein said control device is for automatic control of said switch apparatus and/or said damping apparatus and detects a variable that affects said shock absorber.

16. Shock absorber according to claim 8, wherein the separating piston is joined to the piston rod of the first cylinder.

17. Shock absorber according to claim 14, wherein the operating element is a handle.

18. Shock absorber according to claim 14, wherein the operating element is a switch lever.

19. Shock absorber according to claim 14, wherein the operating element is an adjuster wheel.

20. Shock absorber according to claim 15, wherein said control device comprises a speedometer.

21. Shock absorber according to claim 15, wherein said control device comprises an inclination sensor.

22. Shock absorber according to claim 1, wherein said transmission or damping medium is non-compressible.

23. The adjustable shock absorber of claim 1 wherein the first cylinder includes an elongated housing and at least one of the second and additional cylinders includes an additional housing arranged laterally adjacent and attached to the elongated housing and having a portion of the communicating channel extending from the additional housing to the elongated housing.

24. The adjustable shock absorber of claim 23 wherein the other of the second and additional cylinders includes another separate housing arranged laterally adjacent to both the elongated housing and the additional housing and attached to at least the elongated housing, and a further portion of the communicating channel extending from the separate housing to the elongated housing.

25. The adjustable shock absorber of claim 23 wherein the elongated housing extends beyond the first cylinder and forms a common housing for the first cylinder and the other of the second and additional cylinders, and a further portion of the communicating channel extending internally within the common housing.

26. The adjustable shock absorber of claim 1 wherein at least one of the second and additional cylinders have a valve located in the air-filled or gas-filled pressure chamber for adjusting the gas pressure when the shock absorber is at rest to further vary the shock absorber behavior characteristics.

27. The adjustable shock absorber of claim 1 wherein each of the second and additional cylinders have a separate valve located between the air-filled or gas-filled pressure chambers for separately adjusting the gas pressure within that respective chamber when the shock absorber is at rest.

28. The adjustable shock absorber of claim 1 wherein the compressible chamber is an air-filled or gas-filled gas pressure chamber which is opposite the fluid chamber and separated therefrom by a piston connected to the piston rod, a valve located in the first cylinder gas pressure chamber for adjusting the gas pressure within the first cylinder gas pressure chamber, and at least an additional valve located in the air-filled or gas-filled pressure chamber of the second and additional cylinders for separately adjusting the gas pressure within that respective chamber.

29. The adjustable shock absorber of claim 1 wherein the switch apparatus has a plurality of switch conditions each corresponding to one of the plurality of different shock absorber behavior characteristics, and an actuating element movable to select each of the plurality of switch conditions.

30. The adjustable shock absorber of claim 29 wherein the switch apparatus includes a switch condition which interrupts the communicating channel to block flow to at least certain of the second and additional cylinders.

31. The adjustable shock absorber of claim 1 wherein the communicating channel has separate branches to the second and additional cylinders, and the switch apparatus can be controlled so that one or both branches can be switched into the flow path.

32. An adjustable shock absorber having selectable behavior characteristics, comprising:
   a main cylinder having a main fluid chamber filled with a transmission or damping medium and spaced therefrom a compressible chamber, a piston located between the fluid chamber and the compressible chamber, and a piston rod extending outwardly from the piston for receiving shocks to be damped or compressed,
   a first branch cylinder having a first fluid chamber filled with the medium and a first gas pressure chamber,
   a second branch cylinder having a second fluid chamber filled with the medium and a second gas pressure chamber, a communicating channel interconnecting the fluid chambers of said cylinders for creating a flow path for the transmission or damping medium therebetween, and a switch apparatus located in the communicating channel and having an actuating element for selecting one of a plurality of different switch conditions, the actuating element causing through-flow or interrupting of the medium to switch at least one of the branch cylinders into or out of the flow path and thereby select different behavior characteristics corresponding to the plurality of different switch conditions.

33. The adjustable shock absorber of claim 32 wherein the switch apparatus can select through-flow or interrupting of the medium to one or both branch cylinders whereby the external force acting on the piston is distributed to the branch cylinders that have been switched into flow communications with the main fluid chamber.

34. The adjustable shock absorber of claim 32 wherein the communicating channel has separate branches to the first and second branch cylinders, and the switch apparatus can switch one or both branches into the flow path.

35. The adjustable shock absorber of claim 32 wherein the main cylinder is located in an elongated housing, at least one of the branch cylinders is located in a separate housing arranged laterally adjacent and attached to the elongated housing, and the communicating channel includes a branch interconnecting the separate housing to the elongated housing.

36. The adjustable shock absorber of claim 35 wherein the elongated housing forms a common housing for the main cylinder and a remaining one of the branch cylinders.

37. The adjustable shock absorber of claim 36 wherein the compressible chamber is a gas pressure chamber separated by the piston from the main fluid chamber, the fluid chambers of the main cylinder and remaining branch cylinder are facing each other in the elongated housing with the gas pressure chambers of the main and remaining branch cylinders being located at opposite ends of the elongated housing.

38. The adjustable shock absorber of claim 32 wherein at least one of the branch cylinders have a valve located in the gas pressure chamber for adjusting the gas pressure when the shock absorber is at rest to further vary the behavior characteristics of the adjustable shock absorber.

39. The adjustable shock absorber of claim 32 wherein the compressible chamber includes a spring that is pressure-actuated when the piston rod moves within the main cylinder.

40. The adjustable shock absorber of claim 39 wherein the piston rod extends from the piston and through the compressible chamber to outside the main cylinder, and the spring surrounds the piston rod.

41. The adjustable shock absorber of claim 32 wherein the compressible chamber is an air-filled or gas-filled pressure chamber.

42. The adjustable shock absorber of claim 32 including a damping apparatus located in the communicating channel and having plural flow paths that can provide independent flow-through amounts separate from one another.

* * * * *